(12) United States Patent
Yamamoto et al.

(10) Patent No.: US 10,875,577 B2
(45) Date of Patent: Dec. 29, 2020

(54) TRACTION ASSIST APPARATUS

(71) Applicant: AISIN SEIKI KABUSHIKI KAISHA, Kariya (JP)

(72) Inventors: Kinji Yamamoto, Anjo (JP); Kazuya Watanabe, Anjo (JP); Tetsuya Maruoka, Okazaki (JP); Itsuko Fukushima, Anjo (JP); Takayuki Nakasho, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/614,823

(22) PCT Filed: Feb. 27, 2018

(86) PCT No.: PCT/JP2018/007264
§ 371 (c)(1),
(2) Date: Nov. 19, 2019

(87) PCT Pub. No.: WO2019/058586
PCT Pub. Date: Mar. 28, 2019

(65) Prior Publication Data
US 2020/0207415 A1   Jul. 2, 2020

(30) Foreign Application Priority Data
Sep. 25, 2017  (JP) .................. 2017-183173

(51) Int. Cl.
B62D 15/02     (2006.01)
(52) U.S. Cl.
CPC ................ *B62D 15/029* (2013.01)

(58) Field of Classification Search
CPC combination set(s) only.
See application file for complete search history.

(56) References Cited

U.S. PATENT DOCUMENTS

| 2012/0185131 A1 | 7/2012 | Headley |
| 2014/0160276 A1 | 6/2014 | Pliefke et al. |
| (Continued) | | |

FOREIGN PATENT DOCUMENTS

| JP | 2014-502582 A | 2/2014 |
| JP | 2016-060234 A | 4/2016 |
| JP | 2016-193703 A | 11/2016 |

OTHER PUBLICATIONS

International Search Report for PCT/JP2018/007264 dated May 22, 2018. [PCT/ISA/210].

*Primary Examiner* — Thomas S McCormack
(74) *Attorney, Agent, or Firm* — Sughrue Mion, PLLC

(57) ABSTRACT

A traction assist apparatus includes a memory and a hardware processor coupled to the memory. The hardware processor is configured to acquire a coupling angle between a towing vehicle and a towed vehicle towed by the towing vehicle and acquire a current steered angle of the towing vehicle. The hardware processor is configured to, when the towing vehicle is moved backward at the current steered angle, determine whether the towed vehicle is movable backward in a balance state where the coupling angle is maintained, and monitor whether steering of the towing vehicle is continued in the balance state. The hardware processor is configured to provide notification of presence or absence of the balance state and provide notification of whether the monitoring is continued.

6 Claims, 15 Drawing Sheets

(56) References Cited

U.S. PATENT DOCUMENTS

2014/0309870 A1* 10/2014 Ricci .................. G05D 23/1917
    701/36
2017/0043807 A1* 2/2017 Shepard .................. B60D 1/36
2017/0259850 A1 9/2017 Yamashita et al.

* cited by examiner

TRACTION ASSIST APPARATUS

CROSS-REFERENCE TO RELATED APPLICATIONS

This application is national stage application of International Application No. PCT/JP2018/007264, filed Feb. 27, 2018, which designates the United States, incorporated herein by reference.

TECHNICAL FIELD

Embodiments of the present invention relate to a traction assist apparatus.

BACKGROUND ART

Conventionally, a towing vehicle (a tractor) that tows a towed vehicle (a trailer) has been known. A traction device constituted by a traction bracket, a coupling ball (a hitch ball), and the like is provided at a rear portion of the towing vehicle, and a device to be towed (a coupler) is provided at a distal end of the towed vehicle. Then, the towing vehicle tows the towed vehicle to be capable of turning by coupling the hitch ball and the coupler. When the towing vehicle moves forward in a state where the towing vehicle and the towed vehicle are coupled, the towed vehicle travels so as to substantially follow a steering state of the towing vehicle. On the other hand, for example, when the towing vehicle moves backward for parking or the like, that is, when the towed vehicle is pushed by the towing vehicle, the towed vehicle behaves differently from the steering state of the towing vehicle in some cases. For example, there is a case where the towed vehicle is greatly bent at a portion of the traction device, or reversely, the bending angle decreases depending on a coupling angle between the towing vehicle and the towed vehicle at that time. Therefore, there is proposed a vehicle display system that facilitates recognition of current states (postures) of the towing vehicle and the towed vehicle by detecting a relative angle between the towing vehicle and the towed vehicle based on an image captured by an imaging device provided at the rear of the towing vehicle and displaying expected courses (backward movement trajectories) of the towed vehicle and the towing vehicle based on the relative angle on a display device.

CITATION LIST

Patent Literature

Patent Literature 1: Specification of U.S. Patent Application Publication No. 2014/0160276

SUMMARY OF INVENTION

Problem to be Solved by the Invention

In the related art, however, it is difficult to determine presence or absence of a so-called "balance state" in which a movement direction of the towed vehicle is maintained when the towing vehicle is moved backward with a current steered angle only with the display of the expected courses of the towing vehicle and the towed vehicle. In addition, when attention is paid to a display content of the display device to grasp behaviors of the towing vehicle or the towed vehicle, grasping of a peripheral situation is neglected in some cases. Therefore, it is meaningful to provide a traction assist apparatus which enables easy recognition of a "balance state" between a towing vehicle and a towed vehicle without concentration on confirmation of the balance state after shifting to the balance state.

Means for Solving Problem

A traction assist apparatus according to an embodiment of the present invention includes, for example: a memory and a hardware processor coupled to the memory. The hardware processor is configured to acquire a coupling angle between a towing vehicle and a towed vehicle towed by the towing vehicle and acquire a current steered angle of the towing vehicle; when the towing vehicle is moved backward at the current steered angle, determine whether the towed vehicle is movable backward in a balance state where the coupling angle is maintained, and monitor whether steering of the towing vehicle is continued in the balance state; and provide notification of presence or absence of the balance state and provide notification of whether the monitoring is continued. According to this configuration, when the towing vehicle is moved backward at a current steered angle, it is easy to recognize that the towed vehicle can be moved backward in a balance state while maintaining a coupling angle. In addition, the monitoring of whether the balance state is continued is performed and a result thereof is notified, so that it is easy to recognize the balance state and it is easy to perform confirmation or an operation other than confirmation of the balance state.

The hardware processor in the traction assist apparatus according to an embodiment may start the monitoring when the towing vehicle starts to move in the balance state. According to this configuration, when a driver intends to cause the towing vehicle to travel in the balance state, the monitoring on whether the balance state is maintained is started. It is possible to avoid continuous execution of the notification at the time of steering not intended for the balance state.

The hardware processor in the traction assist apparatus according to an embodiment may end the monitoring when a difference between a steered angle of the towing vehicle where the balance state is established and a current steered angle of the towing vehicle after starting the monitoring is a first reference value or more. According to this configuration, when a steering wheel is turned by the driver such that a difference in steered angle becomes a first reference value or more, it can be determined that the driver has no intention for the travel in the balance state, and the monitoring can be automatically ended.

The hardware processor in the traction assist apparatus according to an embodiment may end the monitoring when: a difference between the steered angle of the towing vehicle where the balance state is established and a current steered angle of the towing vehicle after starting the monitoring is less than the first reference value; and a difference between a coupling angle between the towing vehicle and the towed vehicle where the balance state is established and a current coupling angle between the towing vehicle and the towed vehicle after starting the monitoring is a second reference value or more. According to this configuration, when the towed vehicle turns against driver's will due to a situation of a road surface or the like and a difference in coupling angle becomes a second reference value or more, it can be determined that the driver has no intention for return to the balance state, and the monitoring can be automatically ended.

The hardware processor in the traction assist apparatus according to an embodiment may execute the notification with sound. According to this configuration, it is possible to easily recognize whether the balance state is established and whether the monitoring is continued.

In the traction assist apparatus according to an embodiment, when a center line in a vehicle front-rear direction of the towing vehicle is substantially parallel to a center line in a vehicle front-rear direction of the towed vehicle, the hardware processor may further execute an in-line notification that the towing vehicle and the towed vehicle are coupled in an in-line state. According to this configuration, it is easy to recognize that the towing vehicle and the towed vehicle are in the state of being aligned straight in a vehicle front-rear direction, and it becomes easy to handle the towing vehicle and the towed vehicle.

In the traction assist apparatus according to an embodiment, when the towing vehicle and the towed vehicle shift to the balance state, the hardware processor may change a notification mode of the notification. According to this configuration, it becomes easier to recognize that the towing vehicle and the towed vehicle are in the balance state.

DESCRIPTION OF EMBODIMENTS

Hereinafter, an exemplary embodiment of the present invention is disclosed.

Configurations of the embodiment to be described hereinafter, and functions, results, and effects provided by the configurations are examples. The present invention can be realized by configurations other than those disclosed in the following embodiment, and at least one of various effects based on the basic configurations and derivative effects thereof can be obtained.

Figure 1:
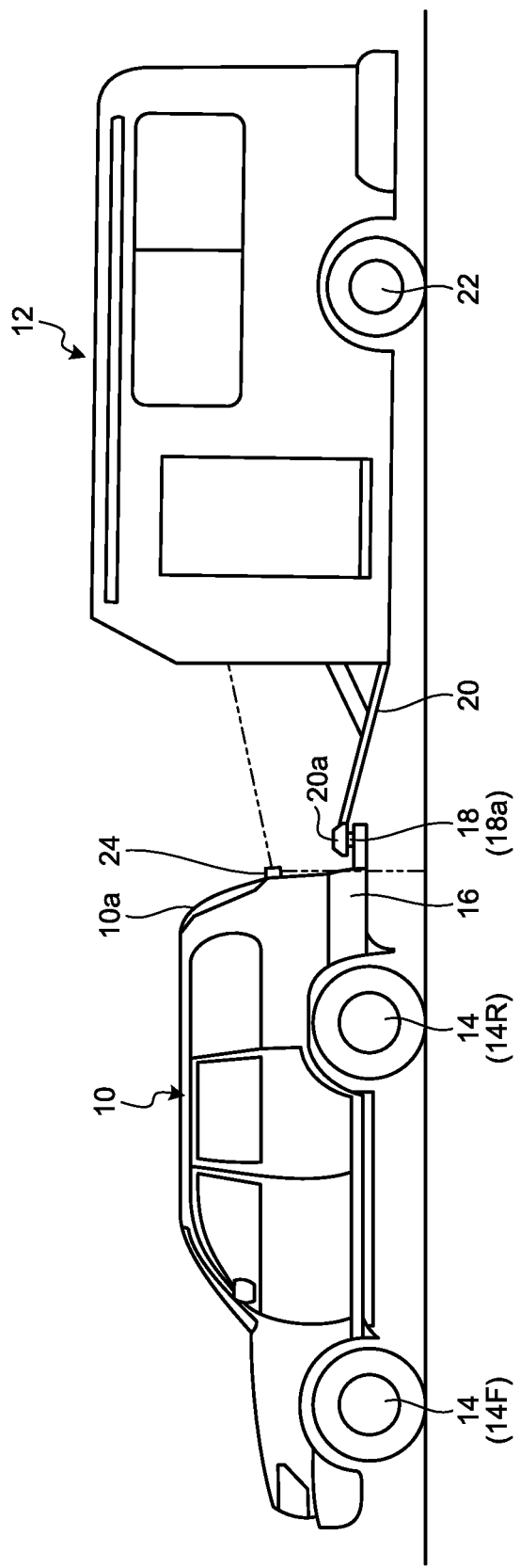
FIG. 1 is a side view schematically illustrating an example of a coupling state between a towing vehicle equipped with a traction assist apparatus according to an embodiment and a towed vehicle.
Figure 2:
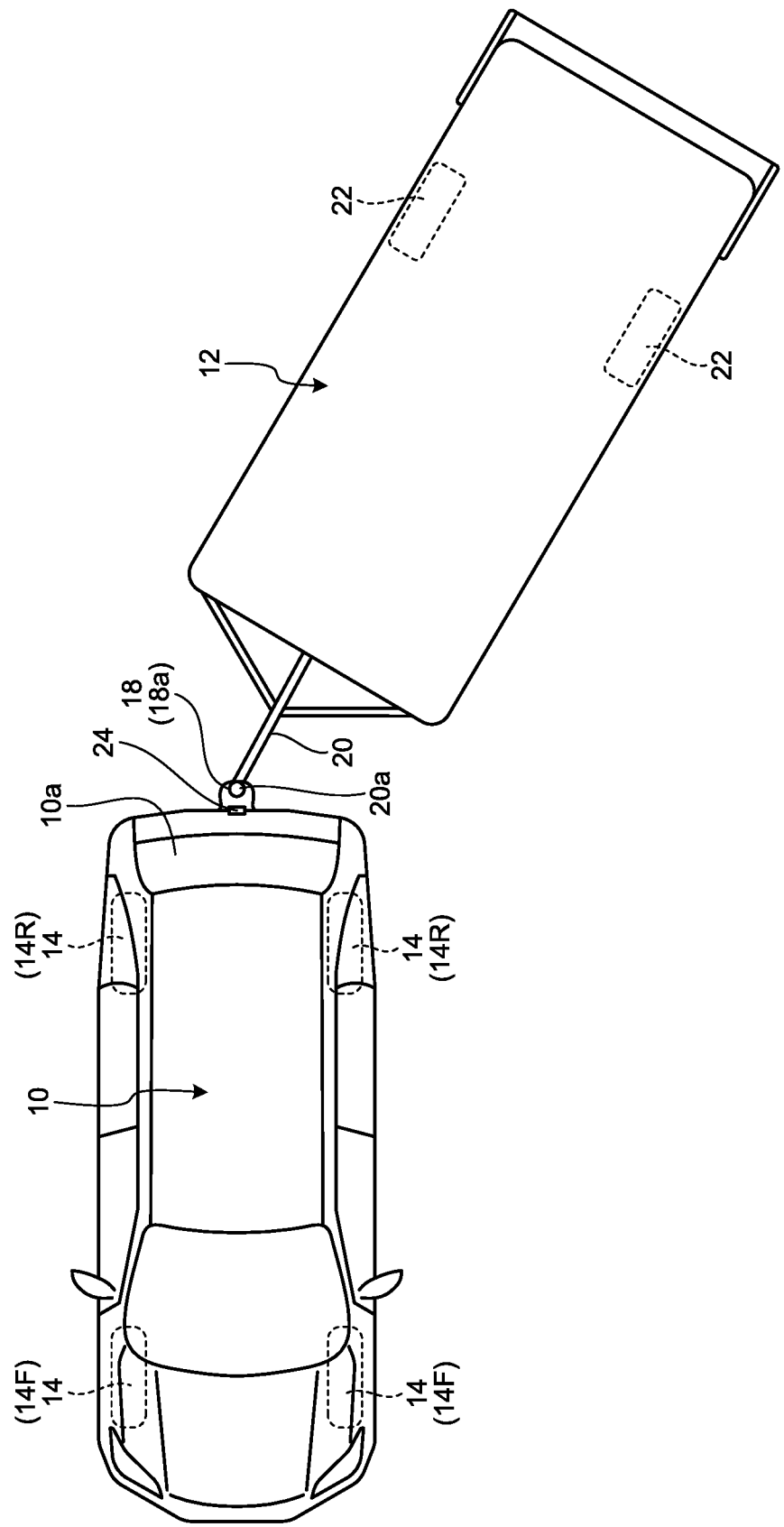
FIG. 2 is a top view schematically illustrating the example of the coupling state between the towing vehicle equipped with the traction assist apparatus according to the embodiment and the towed vehicle.
Figure 3:
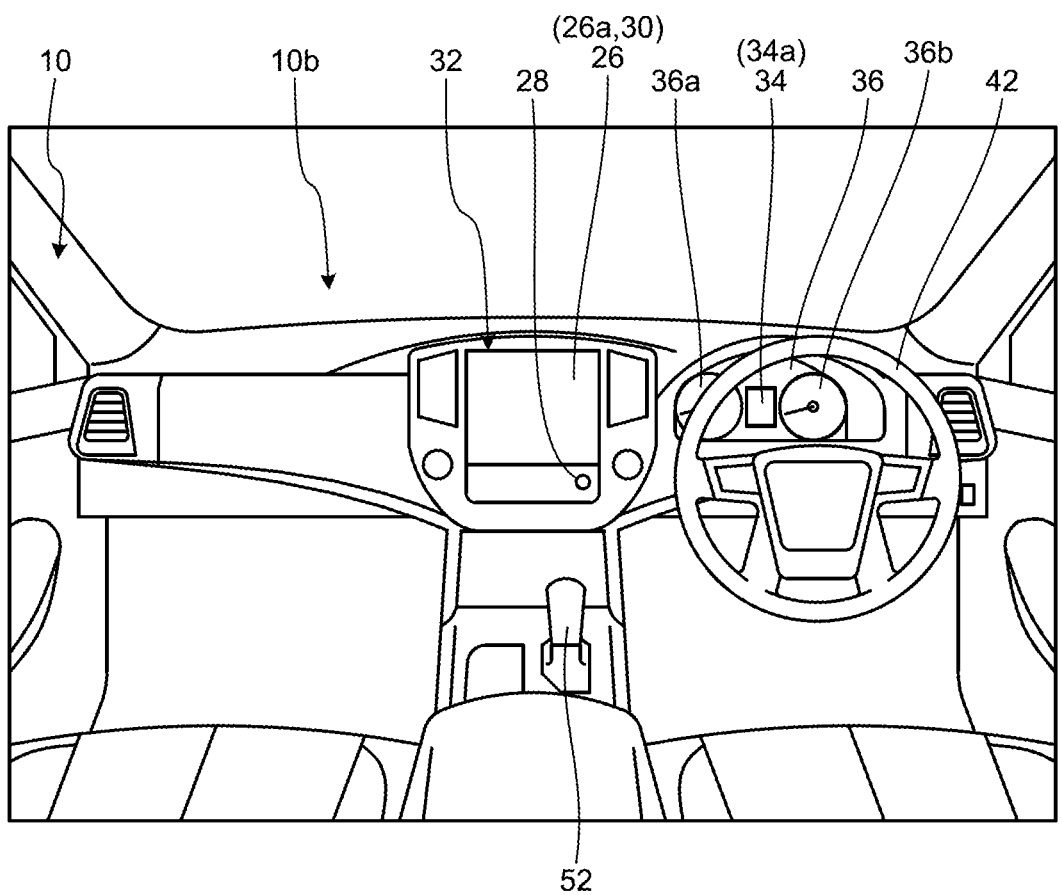
FIG. 3 is a schematic view illustrating an example of the interior of a passenger compartment of the towing vehicle equipped with the traction assist apparatus according to the embodiment.

FIG. 1 is a side view illustrating a towing vehicle 10 equipped with a traction assist apparatus of an embodiment and a towed vehicle 12 towed by the towing vehicle 10. In FIG. 1, the left direction in the paper surface is the front with respect to the towing vehicle 10, and the right direction in the paper surface is the rear with respect to the towing vehicle 10. FIG. 2 is a top view of the towing vehicle 10 and the towed vehicle 12 illustrated in FIG. 1. FIG. 3 is a view illustrating an example of the interior of a passenger compartment of the towing vehicle 10 equipped with the traction assist apparatus of the embodiment, and is a view of the interior of the passenger compartment as viewed from the rear of the towing vehicle 10.

The towing vehicle 10 may be, for example, an automobile (internal combustion engine automobile) using an internal combustion engine (an engine, which is not illustrated) as a driving source, may be an automobile (an electric vehicle, a fuel cell vehicle, or the like) using an electric motor (a motor, which is not illustrated) as a driving source, or may be an automobile (a hybrid automobile) using both the internal combustion engine and the electric motor as driving sources. The towing vehicle 10 may be a sport utility vehicle (SUV) as illustrated in FIG. 1, or may be a so-called "pickup truck" in which a loading platform is provided on the rear side of the vehicle. In addition, the towing vehicle 10 may be a general passenger car. The towing vehicle 10 can be equipped with various transmissions, and can be equipped with various devices (systems, components, or the like) required to drive the internal combustion engine or the electric motor. In addition, schemes, the number, the layout, or the like of devices relating to driving of wheels 14 in the towing vehicle 10 can be set variously.

A traction device 18 (hitch) configured to tow the towed vehicle 12 protrudes from a lower portion of, for example, a central portion in a vehicle width direction of a rear bumper 16 of the towing vehicle 10. The traction device 18 is fixed to, for example, a frame of the towing vehicle 10. The traction device 18 includes, as an example, a hitch ball 18a having a spherical distal end that is erected in the vertical direction (vehicle up-down direction), and the hitch ball 18a is covered with a coupler 20a provided at the distal end of a coupling member 20 fixed to the towed vehicle 12. As a result, the towing vehicle 10 and the towed vehicle 12 are coupled, and the towed vehicle 12 can swing (turn) in the vehicle width direction with respect to the towing vehicle 10. That is, a hitch ball 18a transmits a front/rear/left/right motion to the towed vehicle 12 (the coupling member 20), and receives power of acceleration or deceleration.

The towed vehicle 12 may be a box type including at least one of a boarding space, a living section, a storage space, and the like, for example, as illustrated in FIG. 1, and may be a loading platform type that loads luggage (for example, a container, a boat, or the like). The towed vehicle 12 illustrated in FIG. 1 includes a pair of trailer wheels 22 as an example. The towed vehicle 12 of FIG. 1 is a driven vehicle provided with driven wheels without including driving wheels and a steering wheel.

An imaging unit 24 is provided on a lower wall of a rear hatch 10a on the rear side of the towing vehicle 10. The imaging unit 24 is, for example, a digital camera that incorporates an imaging element such as a charge coupled device (CCD) and a CMOS image sensor (CIS). The imaging unit 24 can output moving image data (captured image data) at a predetermined frame rate. The imaging unit 24 has a wide-angle lens or a fish-eye lens, and can image a range of, for example, 140° to 220° in the horizontal direction. In addition, an optical axis of the imaging unit 24 is set to the obliquely downward side. Accordingly, the imaging unit 24 sequentially captures a region including a rear end of the towing vehicle 10, the coupling member 20, and at least a front end of the towed vehicle 12 (for example, a range indicated by a two-dot chain line, see FIG. 1), and outputs the captured region as captured image data. The captured image data imaged by the imaging unit 24 can be used to detect a coupling state (for example, a coupling angle, presence or absence of coupling, or the like) between the towing vehicle 10 and the towed vehicle 12. In this case, it is possible to acquire the coupling state and the coupling angle with the towed vehicle 12 based on the captured image data imaged by the imaging unit 24 provided in the rear hatch 10a of the towing vehicle 10. Thus, the system configuration can be simplified and loads of arithmetic processing and image processing can be mitigated. In another embodiment, the towing vehicle 10 may include a plurality of imaging units that image the side and front of the towing vehicle 10 in order to recognize an environment around the towing vehicle 10. In addition, an imaging unit may be provided on the side or the rear of the towed vehicle 12. It is possible to execute the arithmetic processing and image processing based on captured image data obtained by the plurality of imaging units to generate an image with a wider viewing angle or to generate a virtual bird's-eye view image (a planar image) when the towing vehicle 10 is viewed from above.

In addition, a display device 26, a sound output device 28, and the like are provided in a passenger compartment 10b of the towing vehicle 10 as illustrated in FIG. 3. The display device 26 is, for example, a liquid crystal display (LCD), an organic electroluminescent display (OELD), or the like. The sound output device 28 is a speaker as an example. In addition, the display device 26 is covered with a transparent operation input unit 30 (for example, a touch panel or the like) in the present embodiment as an example. A user (a driver) can visually recognize a video (an image) displayed on a screen 26a of the display device 26 via the operation input unit 30. In addition, the driver can execute an operation input (an instruction input) by touching, pushing, or moving the operation input unit 30 with a finger or the like at a position corresponding to the video (image) displayed on the screen 26a of the display device 26. In addition, the display device 26, the sound output device 28, the operation input unit 30, and the like are provided in a monitor device 32 located at a central portion of a dashboard in the vehicle width direction (a left-right direction) in the present embodiment as an example. The monitor device 32 can have an operation input unit (not illustrated) such as a switch, a dial, a joystick, and a push button. In addition, a sound output device (not illustrated) can be provided at another position in the passenger compartment 10b different from the monitor device 32, and a sound can be output from the sound output device 28 of the monitor device 32 and the other sound output device. In addition, the monitor device 32 is also used as a navigation system and an audio system in the present embodiment as an example, but a monitor device for a traction assist apparatus may be provided separately from these systems.

The display device 26 displays information on whether the towing vehicle 10 and the towed vehicle 12 are in a coupling state (a balance state) where the coupling angle is substantially maintained, for example, when the towed vehicle 12 is towed forward or backward (pushed back) by the towing vehicle 10. For example, the display device 26 provides notification of whether a steered angle of the towing vehicle 10 is a steered angle that can maintain the balance state (a coupling posture) of the towed vehicle 12 with respect to the towing vehicle 10. For example, there is a case where the towing vehicle and the towed vehicle 12 are coupled straight in the front-rear direction (for example, the coupling angle=0°±2°) such that a vehicle center axis of the towing vehicle 10 (a center line in the vehicle front-rear direction) is substantially parallel with (for example, coincides with) a vehicle center axis of the towed vehicle 12. In this case, the towed vehicle 12 can be pushed in the same direction as a movement direction of the towing vehicle 10. That is, notification is provided that the towing vehicle 10 and the towed vehicle 12 are in the balance state, and the display device 26 and the sound output device 28 are in the balance state. In addition, there is a case where the balance state is established even when the coupling angle between the towing vehicle 10 and the towed vehicle 12 is other than 0°±2°(≈0). For example, even when the towed vehicle 12 is coupled to the towing vehicle 10 with an angle, the towing vehicle 10 and the towed vehicle 12 move while exhibiting substantially the same behavior when turning around the same turning center position. When the towing vehicle 10 moves backward while maintaining the balance state (coupling posture), the towing vehicle 10 and the towed vehicle 12 move (turn) while exhibiting behaviors that can be regarded as an integrated vehicle. As a result, the driver can easily grasp the behavior of the towed vehicle 12 and easily move the towed vehicle 12 to, for example, a desired parking space. On the other hand, when the coupling angle is in an unbalance state, the towed vehicle 12 starts to bend (starts to turn) according to the coupling angle at that time as the towing vehicle 10 moves backward, and the coupling angle is further increased or decreased with the hitch ball 18a (the traction device 18) as a fulcrum. That is, the behavior of the towing vehicle 10 does not coincide with the behavior of the towed vehicle 12, and the towed vehicle 12 starts to move in a direction different from the turning direction (a movement direction) of the towing vehicle 10. As a result, it is difficult to grasp the movement of the towed vehicle 12, and more advanced steering technique and steering experience are required. In the present embodiment, it is possible to easily grasp the behavior of the towed vehicle 12, particularly, when the towed vehicle 12 is moved backward by the towing vehicle 10 by providing notification of whether the balance state is established. In addition, the display device 26 can display information on whether it is a "balance monitoring mode" for monitoring whether handling (travel or stop) of the towing vehicle 10 continues while maintaining the current "balance state" as described above of the towing vehicle 10 and the towed vehicle 12.

In addition, a display device 34 different from the display device 26 may be provided in the passenger compartment 10b. As illustrated in FIG. 3, the display device 34 is provided, for example, on an instrument cluster 36 of the dashboard, and is located between a speed display unit 36a and a rotational speed display unit 36b at the approximate center of the instrument cluster 36. A size of a screen 34a of the display device 34 is smaller than a size of the screen 26a of the display device 26. The display device 34 can simply indicate, for example, whether the towed vehicle 12 is in the "balance state" with the towing vehicle 10, whether the "balance monitoring mode" is being executed, and the like. The display device 34 may display an indicator, a mark, and an image representing character information that indicate whether a current state is, for example, the "balance state" or the "balance monitoring mode" in an auxiliary manner. The amount of information displayed on the display device 34 may be smaller than the amount of information displayed on the display device 26. The display device 34 is, for example, an LCD, an OELD, or the like. In addition, the display device 34 may be configured using an LED or the like. The information displayed on the display device 34 may be displayed on the display device 26.

Figure 4:
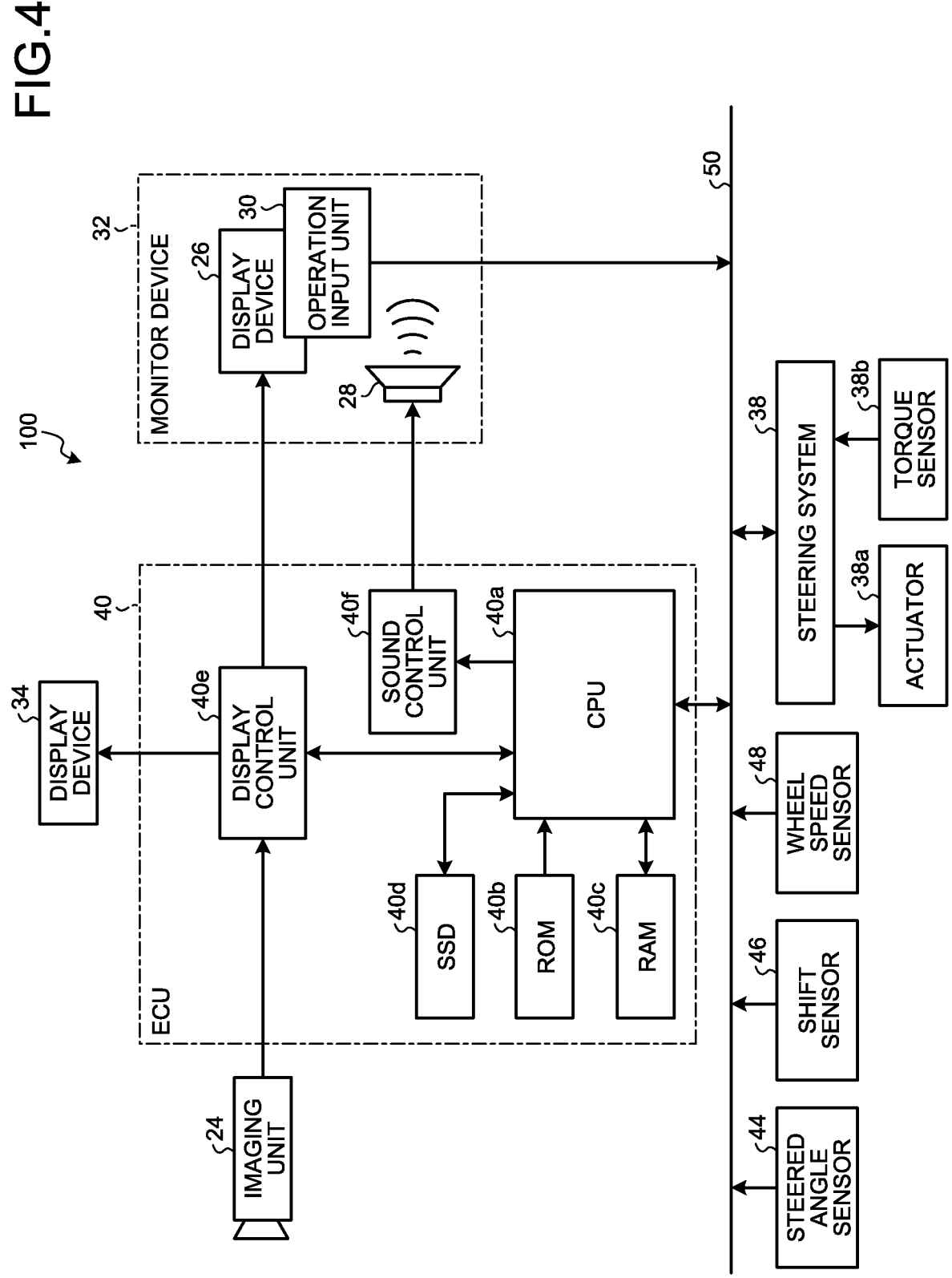
FIG. 4 is an exemplary block diagram of a configuration of a traction assist system including the traction assist apparatus according to the embodiment.

In addition, as illustrated in FIGS. 1 and 2, the towing vehicle 10 is, for example, a four-wheeled vehicle, and has two left and right front wheels 14F and two left and right rear wheels 14R. Each of those four wheels 14 can be configured to be steerable. The towing vehicle 10 has a steering system 38 that steers at least two wheels 14 as illustrated in FIG. 4. The steering system 38 includes an actuator 38a and a torque sensor 38b. The steering system 38 is electrically controlled by an ECU 40 (electronic control unit) or the like to operate the actuator 38a. The steering system 38 is, for example, an electric power steering system, a steer by wire (SBW) system, or the like. The steering system 38 adds a torque, that is, an assist torque to a steering unit 42 (a steering wheel, see FIG. 3) by the actuator 38a to compensate for a steering force, or steers the wheel 14 by the actuator 38a. In this case, the actuator 38a may steer one wheel 14 or may steer a plurality of wheels 14. In addition, the torque sensor 38b also detects, for example, the torque that is applied to the steering unit 42 by the driver.

As illustrated in FIG. 4, not only the ECU 40, the monitor device 32, and the steering system 38, but also a steered angle sensor 44, a shift sensor 46, a wheel speed sensor 48, and the like are electrically connected via an in-vehicle network 50 serving as an electric communication line in a traction assist system 100 (the traction assist apparatus). The in-vehicle network 50 is configured, for example, as a controller area network (CAN). The ECU 40 can control the steering system 38 and the like by transmitting a control signal through the in-vehicle network 50. In addition, the ECU 40 can receive detection results of the torque sensor 38b, the steered angle sensor 44, the shift sensor 46, the wheel speed sensor 48, and the like and an operation signal of the operation input unit 30 or the like via the in-vehicle network 50.

The ECU 40 includes, for example, a CPU 40a (Central Processing Unit), a ROM 40b (Read Only Memory), a RAM 40c (Random Access Memory), an SSD 40d (Solid State Drive or a flash memory), a display control unit 40e, a sound control unit 40f, and the like. For example, the CPU 40a can execute various types of arithmetic processing and control such as image processing that relates to the images displayed on the display devices 26 and 34, detection processing of the coupling state between the towing vehicle 10 and the towed vehicle 12, and notification processing of the detection result thereof. The CPU 40a can read a program installed and stored in a non-volatile storage device such as the ROM 40b and execute the arithmetic processing according to the program. The RAM 40c temporarily stores various types of data to be used in the calculation by the CPU 40a. In addition, the display control unit 40e mainly executes, for example, composition of pieces of image data displayed by the display devices 26 and 34 in the arithmetic processing of the ECU 40. In addition, the sound control unit 40f mainly executes processing of sound data output from the sound output device 28 in the arithmetic processing in the ECU 40. In addition, the SSD 40d is a rewritable non-volatile storage unit, and can store data even when a power supply of the ECU 40 is turned off. The CPU 40a, the ROM 40b, the RAM 40c, and the like can be integrated inside the same package.

In addition, the ECU 40 may have a configuration in which another logical operation processor such as a digital signal processor (DSP), a logic circuit, or the like is used instead of the CPU 40a. In addition, a hard disk drive (HDD) may be provided instead of the SSD 40d, and the SSD 40d and the HDD may be provided separately from the ECU 40.

The steered angle sensor 44 is, for example, a sensor that detects a steering amount of the steering unit 42 such as a steering wheel (a steered angle of the towing vehicle 10). The steered angle sensor 44 is configured by using, for example, a Hall element or the like. The ECU 40 acquires the steering amount of the steering unit 42 applied by the driver, the steering amount of each of the wheels 14 during automatic steering, and the like from the steered angle sensor 44 and executes various types of control. The steered angle sensor 44 detects a rotation angle of a rotating portion included in the steering unit 42. The steered angle sensor 44 is an example of an angle sensor.

The shift sensor 46 is, for example, a sensor that detects a position of a movable portion of a speed-change operation unit 52 (for example, a shift lever, see FIG. 3). The shift sensor 46 can detect a position of a lever, an arm, a button, or the like as the movable portion. The shift sensor 46 may include a displacement sensor or may be configured as a switch.

The wheel speed sensor 48 is a sensor that detects the amount of rotation and the number of rotations per unit time of the wheel 14. The wheel speed sensor 48 is arranged at each of the wheels 14 and outputs a wheel speed pulse number indicating the number of rotations detected by each of the wheels 14 as a sensor value. The wheel speed sensor 48 can be configured, for example, using a Hall element or the like. The ECU 40 calculates the amount of movement of the towing vehicle 10 or the like based on the sensor value acquired from the wheel speed sensor 48, and executes various types of control. When calculating the vehicle speed of the towing vehicle 10 based on each sensor value of the wheel speed sensors 48, the CPU 40a determines the vehicle speed of the towing vehicle based on the speed of the wheel 14 having the smallest sensor value among the four wheels and executes various types of control. In addition, when the wheel 14 having a larger sensor value than the other wheels 14 among the four wheels is present, for example, when there is the wheel 14 having the number of rotations per unit period (unit time or unit distance) that is greater than those of the other wheels 14 by a predetermined number or more, the CPU 40a regards that the corresponding wheel 14 is in a slip state (an idle state) and executes various types of control. There is also a case where the wheel speed sensor 48 is provided in a brake system (not illustrated). In such a case, the CPU 40a may acquire the detection result of the wheel speed sensor 48 via the brake system.

The configurations, arrangements, electrical coupling modes, and the like of the various sensors and actuator described above are merely examples and can be set (changed) in various manners.

Figure 5:
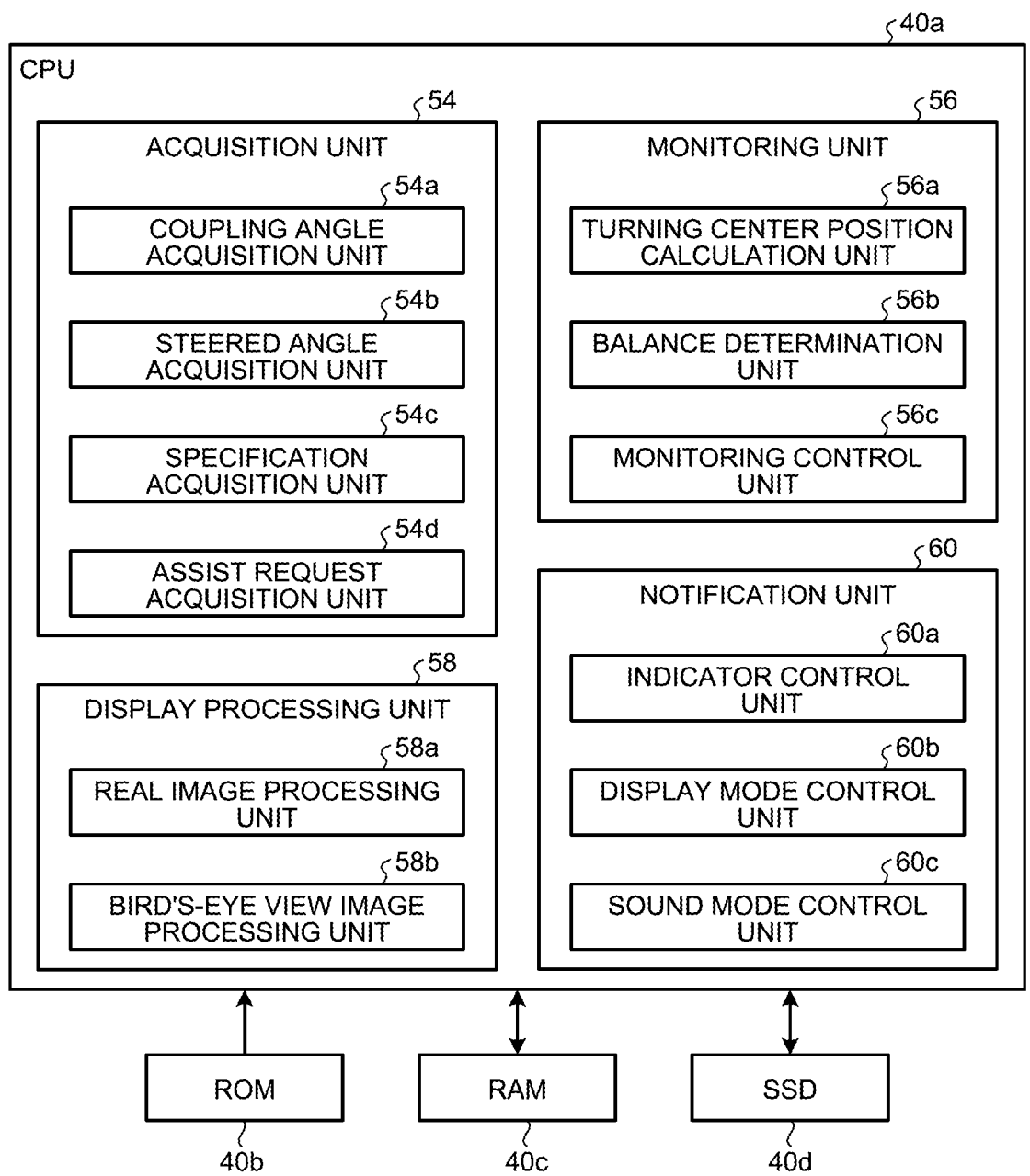
FIG. 5 is an exemplary block diagram of a configuration of a CPU of the traction assist apparatus according to the embodiment.

The CPU 40a included in the ECU 40 includes various modules configured to realize notification processing for providing notification of whether a current steered angle of the towing vehicle 10 is in the balance state, for example, during reverse traction and realize the balance monitoring mode for monitoring whether the balance state is maintained. The various modules are realized as the CPU 40a reads a program installed and stored in a storage device such as the ROM 40b and executes the program. For example, the CPU 40a includes modules such as an acquisition unit 54, a monitoring unit 56, a display processing unit 58, and a notification unit 60 as illustrated in FIG. 5.

The acquisition unit 54 includes, for example, a coupling angle acquisition unit 54a, a steered angle acquisition unit 54b, a specification acquisition unit 54c, an assist request acquisition unit 54d, and the like, each being provided for acquiring various types of information to execute the notification and monitoring. The coupling angle acquisition unit 54a acquires the coupling angle between the towing vehicle 10 and the towed vehicle 12, for example, an angle of the coupling member 20 with the traction device 18 as a fulcrum. This coupling angle can be acquired in various methods. For example, an image based on the captured image data imaged by the imaging unit 24 can be acquired by image processing.

Figure 6:
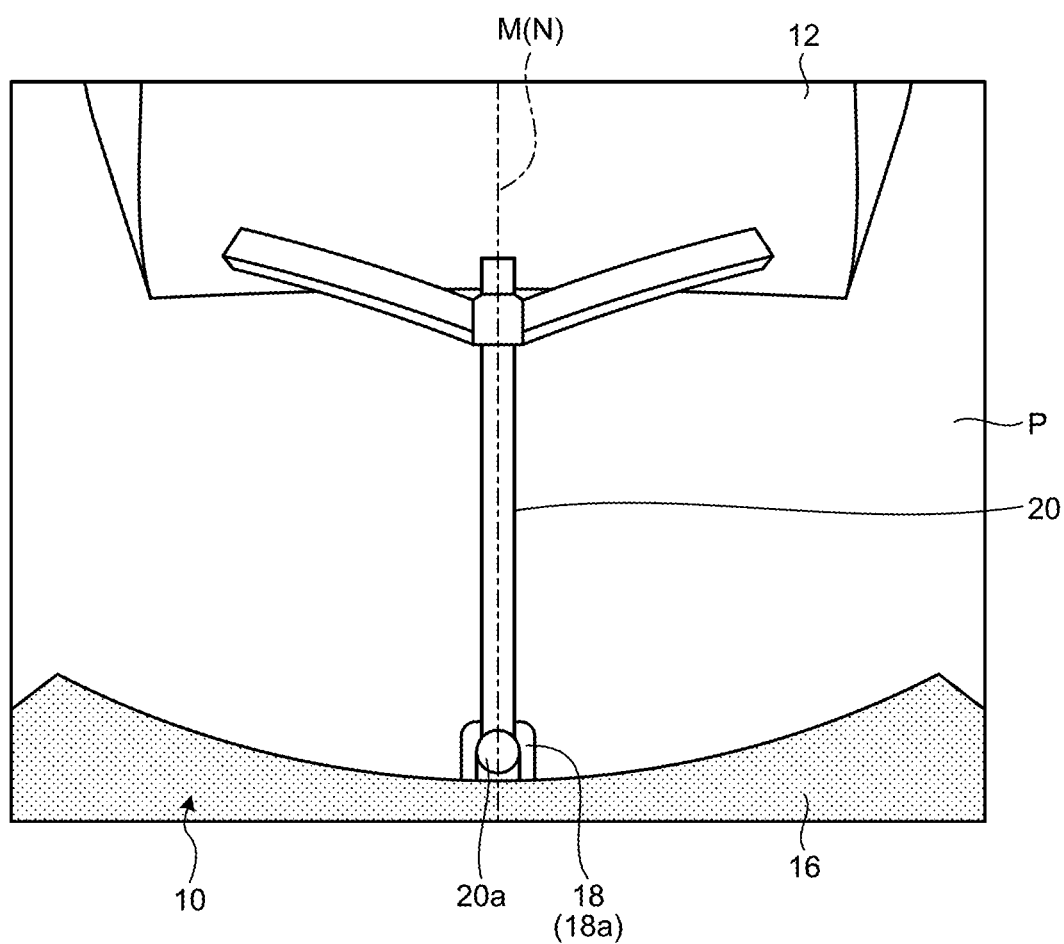
FIG. 6 is a schematic view illustrating an example of an image of a coupling portion between the towing vehicle and the towed vehicle imaged by an imaging unit of the traction assist system including the traction assist apparatus according to the embodiment, the image when the towed vehicle is coupled straight to the towing vehicle.
Figure 7:
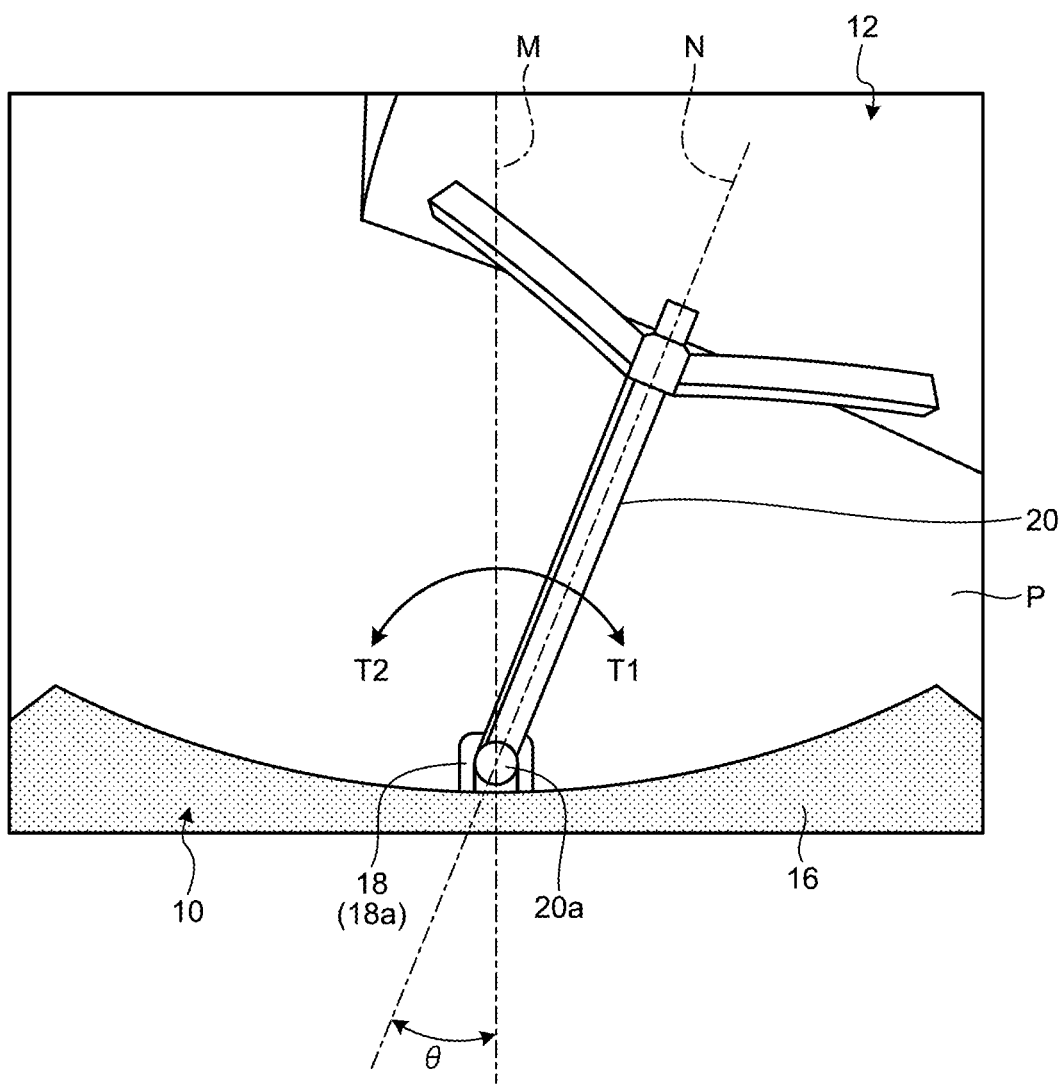
FIG. 7 is a schematic view illustrating an example of an image of the coupling portion between the towing vehicle and the towed vehicle imaged by the imaging unit of the traction assist system including the traction assist apparatus according to the embodiment, the image when the towed vehicle is coupled to the towing vehicle at a coupling angle θ.

FIGS. 6 and 7 are examples of an image P based on the captured image data imaged by the imaging unit 24. The image P includes the rear bumper 16 of the towing vehicle 10, the traction device 18 (the hitch ball 18a), a part of a distal end of the towed vehicle 12, and the coupling member 20 (the coupler 20a). FIG. 6 illustrates a state where the towed vehicle 12 is coupled to the towing vehicle 10 in a straight in-line state (an in-line posture: for example, a coupling angle θ=0°±2°). As described above, the traction device 18 is positioned approximately at the center in the vehicle width direction of the towing vehicle 10. That is, in this state, a coupling center axis N (a center line) extending in the front-rear direction (a longitudinal direction) of the coupling member 20 (the towed vehicle 12) substantially overlaps the vehicle center axis M (a center line) extending in the front-rear direction of the towing vehicle 10. On the other hand, FIG. 7 illustrates a state where the coupling member 20 (the towed vehicle 12 and the coupler 20a) turns (is bent and towed), for example, in a direction of an arrow T1 with the traction device 18 (the hitch ball 18a) of the towing vehicle 10 as a fulcrum to form the coupling angle θ (an angle between the vehicle center axis M and the coupling center axis N). In this case, the towed vehicle 12 is turning (bending) left as viewed from driver's seat of the towing vehicle 10.

The coupling angle acquisition unit 54a detects, from the image P based on the captured image data imaged by the imaging unit 24, a straight line passing through the coupler 20a among straight lines extending in the front-rear direction of the towed vehicle 12 in the coupling member 20 and sets this straight line as the coupling center axis N of the coupling member 20. Since the vehicle center axis M of the towing vehicle 10 on the image P imaged by the imaging unit 24 is known, the coupling angle θ can be detected from the vehicle center axis M and the coupling center axis N. A coupling angle θ where the towed vehicle 12 (coupling member 20) is turning (bending) in a direction of an arrow T2 can be detected in the same manner. In the example of the present embodiment, the imaging unit 24 is arranged directly above the traction device 18, that is, arranged coaxially with the vehicle center axis M. The coupling member 20 can be viewed from almost directly above, so that it is easy to detect the coupling angle θ formed by the vehicle center axis M and the coupling center axis N. There is a case where it is difficult to install the imaging unit 24 directly above the traction device 18 due to a structural condition of the towing vehicle 10 or other reasons. For example, there is a case where the imaging unit 24 is installed at a position shifted from a center of the rear hatch 10a in either the left or right direction. In this case, two-dimensional coordinates of the image P imaged by the imaging unit 24 are converted into three-dimensional coordinates based on a ground height (a known value based on specifications or the like) of the traction device 18 (the hitch ball 18*a*), whereby the coupling angle θ can be detected based on the vehicle center axis M and the coupling center axis N.

In another embodiment, for example, an angle sensor may be provided in the traction device 18 or the periphery thereof, and an angle of the coupling member 20 with respect to the traction device 18 may be detected, and the angle may be used as the coupling angle θ. In this case, a processing load of the CPU 40*a* can be mitigated.

The steered angle acquisition unit 54*b* acquires a steered angle of the towing vehicle 10 detected by the steered angle sensor 44. That is, the steered angle in a direction, in which the driver intends the towing vehicle 10 (the towed vehicle 12) to drive, is acquired. The steered angle acquisition unit 54*b* may acquire whether the towing vehicle 10 is in the state of being movable forward or backward based on a position of the movable portion of the speed-change operation unit 52 output by the shift sensor 46 such that it is possible to identify whether the current steered angle is a steered angle in the forward movement state or a steered angle in the backward movement state.

Figure 8:
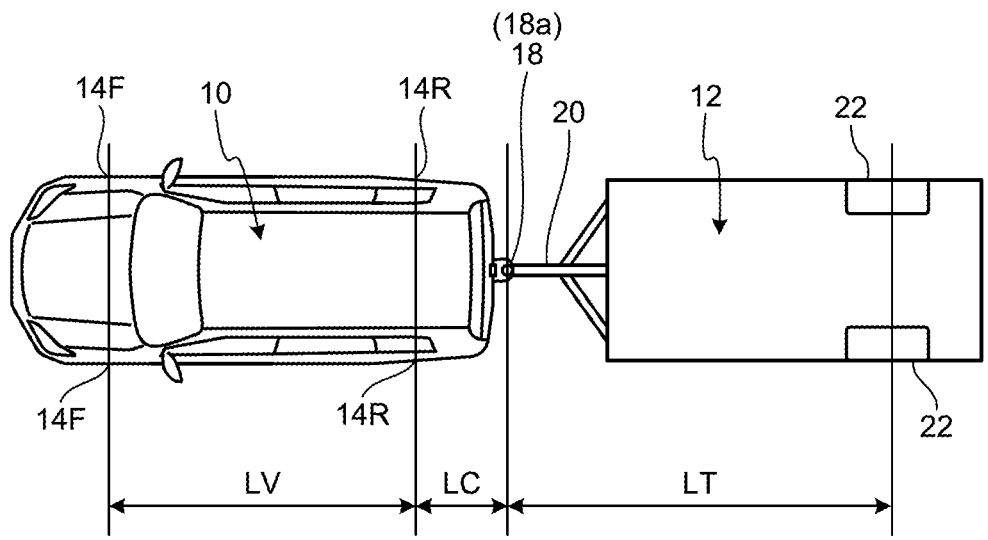
FIG. 8 is a schematic view illustrating a wheelbase length of the towed vehicle in the traction assist apparatus according to the embodiment.

The specification acquisition unit 54*c* mainly acquires the specification of the towed vehicle 12. With regard to the balance state between the towing vehicle 10 and the towed vehicle 12, the "balance state" is established when the vehicle center axis M of the towing vehicle 10 substantially coincides (overlaps) with the coupling center axis N of the towed vehicle 12, as described above. In addition, it can be determined depending on whether a first turning center position of the towing vehicle 10 substantially coincides with a second turning center position of the towed vehicle 12 even when the vehicle center axis M of the towing vehicle 10 does not coincide with the coupling center axis N of the towed vehicle 12, and the "balance state" is established when both the turning center positions coincide with each other. Then, the first turning center position of the towing vehicle 10 can be acquired based on a current steered angle of the towing vehicle 10 and a wheelbase length LV of the towing vehicle 10 (see FIG. 8). On the other hand, the second turning center position of the towed vehicle 12 can be acquired based on the coupling angle θ between the towing vehicle 10 and the towed vehicle 12 and a wheelbase length LT of the towed vehicle 12 (see FIG. 8). The wheelbase length LT of the towed vehicle 12 is a length from the traction device 18 to an axle of the trailer wheel 22 of the towed vehicle 12 including the coupling member 20. However, the towed vehicle 12 of various specifications can be coupled to the towing vehicle 10, and the wheelbase length LT differs depending on the specification of the towed vehicle 12. The specification acquisition unit 54*c* may acquire the wheelbase length LT of the towed vehicle 12 to be coupled by the direct input of the driver or the like using the operation input unit 30 of the monitor device 32, or may regard and acquire a value estimated as the towing vehicle 10 tows the towed vehicle 12 and moves forward as the wheelbase length LT. When the driver directly inputs the wheelbase length LT, for example, the specifications of the towed vehicle 12 can be referred to.

Figure 9:
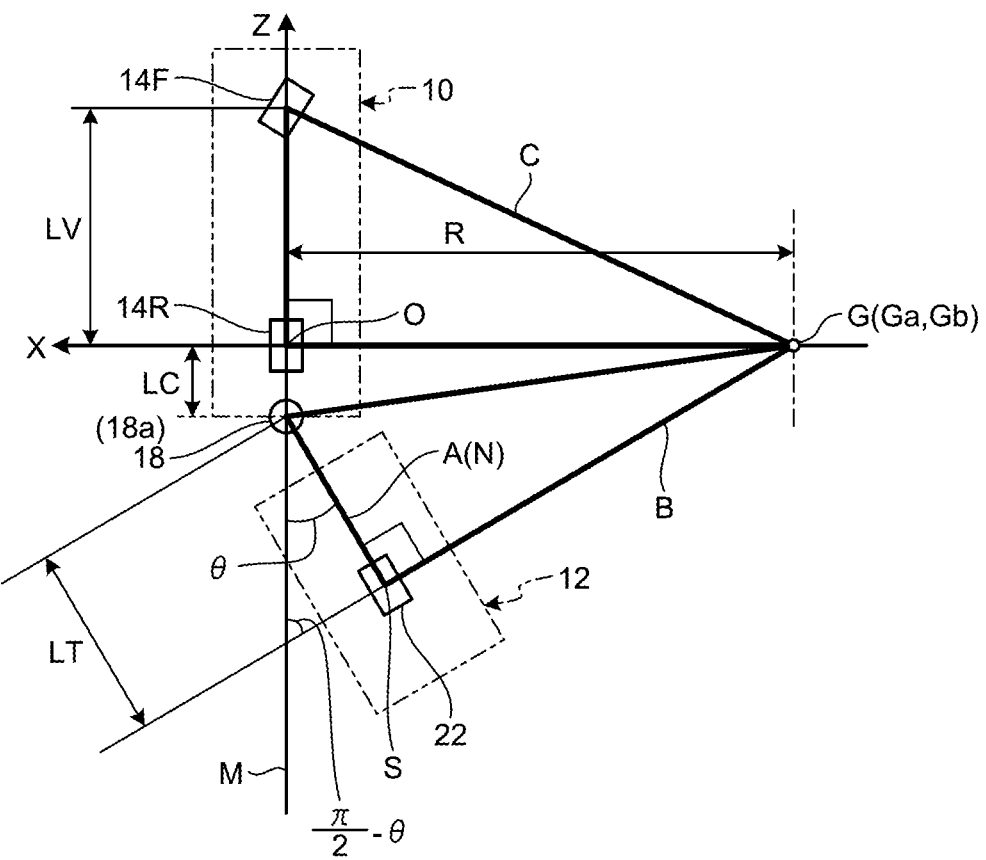
FIG. 9 is a schematic view for describing an example of estimating the wheelbase length of the towed vehicle in the traction assist apparatus according to the embodiment.

FIG. 9 is a schematic view for describing an example of a method of estimating the wheelbase length LT of the towed vehicle 12. A description will be given in FIG. 9 by using a model in which all the front wheel 14F and the rear wheel 14R of the towing vehicle 10, and the trailer wheel 22 of the towed vehicle 12 are present at the center in the vehicle width direction, that is, on the center axis extending in the vehicle front-rear direction (the front wheel 14F and the rear wheel 14R are present on a vehicle center axis M and the trailer wheel 22 is present on a coupling center axis N) for the sake of simplification.

As described above, the balance state between the towing vehicle 10 and the towed vehicle 12 can be determined by using turning center positions G of the towing vehicle 10 and the towed vehicle 12 (in the balance state, a first turning center position Ga=a second turning center position Gb) calculated based on the coupling angle θ between the towing vehicle 10 and the towed vehicle 12, the steering angle of the towing vehicle 10, the wheelbase length LV of the towing vehicle 10, and the wheelbase length LT of the towed vehicle 12. In other words, when the towing vehicle 10 and the towed vehicle 12 are in the balance state at the coupling angle θ, the wheelbase length LT of the towed vehicle 12 can be calculated backward based on such a state. When the towing vehicle 10 is towing the towed vehicle 12 forward (performing driven traction) with a constant turning radius, it is possible to easily form the coupling posture between the towing vehicle 10 and the towed vehicle 12 that enables the balance state at the coupling angle θ.

FIG. 9 is a view for describing a case where the towing vehicle 10 moves forward (performs forward traction) with a turning radius R about the turning center position G (the first turning center position Ga) on X-Z coordinates. In FIG. 9, it is assumed that the rear wheel 14R of the towing vehicle 10 is present at a position of an origin O of the X-Z coordinates, and that a steered angle of the front wheel 14F of the towing vehicle 10 is steered to an angle that enables the rear wheel 14R to turn with the turning radius R. As described above, when the towing vehicle 10 continues forward moving (turning) while maintaining a constant steered angle, the towed vehicle 12 is driven to move about the same turning center position G (Ga) as the towing vehicle 10 in the state of maintaining the coupling angle θ with respect to the vehicle center axis M of the towing vehicle 10 with the traction device 18 fixed to the towing vehicle 10 as a fulcrum. At this time, the wheelbase length LV of the towing vehicle 10 and a hitch distance LC from an axle position of the rear wheel 14R to the traction device 18 are known based on the specifications of the towing vehicle 10 or the like, and the turning radius R can be calculated based on a detection result of the steered angle sensor 44 of the towing vehicle 10. In addition, the coupling angle θ can be acquired based on the captured image data imaged by the imaging unit 24 of the towing vehicle 10. When the towed vehicle 12 is turning about the turning center position G in the balance state, the axle of the trailer wheel 22 of the towed vehicle 12 is present at a position where a straight line passing through the second turning center position Gb of the towed vehicle 12 is perpendicular to the coupling center axis N. Therefore, information (for example, a formula of a straight line A) representing the straight line A in FIG. 9, which passes through the traction device 18 and has an inclination of the coupling angle θ, is acquired. In addition, coordinates of the first turning center position Ga can be acquired based on the steered angle and the wheelbase length LV of the towing vehicle 10. It is possible to acquire information representing the straight line B (for example, a formula of a straight line B) that passes through the first turning center position Ga (Ga=Gb) and has an inclination of $(\pi/2)-\theta$, and to acquire information (coordinates) representing an intersection point S between the straight line A and the straight line B. Then, it is possible to estimate a length of the wheelbase length LT of the towed vehicle 12 based on coordinates of the traction device 18 and the coordinates of the intersection point S.

The assist request acquisition unit 54d acquires information representing whether a balance notification on the balance state between the towing vehicle 10 and the towed vehicle 12 and the shift to the balance monitoring mode (a shift to a traction assist mode) are requested of the traction assist system 100. The balance notification is normally executed when the towing vehicle 10 is coupled to the towed vehicle 12. Therefore, the assist request acquisition unit 54d acquires information representing whether the towed vehicle 12 is currently coupled to the towing vehicle 10. The assist request acquisition unit 54d can receive the presence or absence of coupling of the towed vehicle 12 via the operation input unit 30, for example. The traction device 18 may be provided with a coupling detection device to detect the presence or absence of coupling, or the presence or absence of coupling may be determined by analyzing an image based on the captured image data imaged by the imaging unit 24. When the information representing the coupling of the towed vehicle 12 is acquired by the assist request acquisition unit 54d, the specification acquisition unit 54c may display a specification input request screen on the display device 26 of the monitor device 32. For example, a screen that receives the input of the wheelbase length LT of the towed vehicle 12 may be displayed. At this time, if the driver inputs that the wheelbase length LT is unknown, the specification acquisition unit 54c may estimate and acquire the wheelbase length LT of the towed vehicle 12 by forward moving (forward traction), as described above. In addition, the determination as to whether the towing vehicle 10 and the towed vehicle 12 are in the balance state is mainly utilized at the time when the towing vehicle 10 coupled with the towed vehicle 12 moves backward. Therefore, the assist request acquisition unit 54d may acquire, via the shift sensor 46, information representing whether the speed-change operation unit 52 has shifted to a reverse position (an R range). The assist request acquisition unit 54d may regard that the request for the shift to the traction assist mode has been made when the towed vehicle 12 is coupled and the speed-change operation unit 52 is shifted to the R range.

In addition, the assist request acquisition unit 54d regards that a request for the shift to "balance monitoring mode" has been made when the coupling angle θ between the towing vehicle 10 and the towed vehicle 12 is the "balance state" and it is recognized that the driver has a will to steer the towing vehicle 10 (the towed vehicle 12) in the balance state. For example, it is regarded that the will for the shift to the balance monitoring mode may be confirmed when the speed of the towing vehicle 10 based on the wheel speed of each of the wheels 14 detected by the wheel speed sensor 48 is acquired and the travel of the towing vehicle 10 is started in the balance state. In addition, the assist request acquisition unit 54d may acquire a signal indicating the will for the shift to the balance monitoring mode directly via the operation input unit 30 or the like.

Returning to FIG. 5, when the towing vehicle 10 is moved, for example, backward at the current steered angle of the towing vehicle 10, the monitoring unit 56 determines whether the towed vehicle 12 is movable backward in the coupling posture where the coupling angle θ is maintained, and controls whether to execute the balance monitoring mode that monitors whether the balance state is maintained or not. In order to realize these processes, the monitoring unit 56 includes, for example, a turning center position calculation unit 56a, a balance determination unit 56b, a monitoring control unit 56c, and the like. When it is assumed that the rear wheel 14R of the towing vehicle 10 is present at the origin O on the X-Z coordinates as illustrated in FIG. 9, a position of the front wheel 14F on the Z axis is determined in a case where the wheelbase length LV of the towing vehicle 10 is known. Then, an intersection point between an extension line (the straight line C) of an axle of the front wheel 14F at the current steered angle and the X axis becomes the turning center position G (the first turning center position Ga) of the towing vehicle 10. That is, when the towing vehicle 10 moves at the current steered angle, the turning center position calculation unit 56a can acquire the first turning center position Ga of the towing vehicle 10 based on the steered angle and the wheelbase length LV of the towing vehicle 10. As to the towed vehicle 12, the position of the trailer wheel 22 of the towed vehicle 12 is determined on the X-Z coordinates when the position of the traction device 18, the coupling angle θ, and the wheelbase length LT of the towed vehicle 12 are known. The turning center position of the towed vehicle 12 is present on the extension line (the straight line B) of the axle of the trailer wheel 22, and the intersection point with the X axis becomes the turning center position G (the second turning center position Gb) of the towed vehicle 12. Thus, the turning center position calculation unit 56a can acquire the second turning center position Gb of the towed vehicle 12 based on the coupling angle θ between the towing vehicle 10 and the towed vehicle 12 and the wheelbase length LT of the towed vehicle 12.

Figure 10:
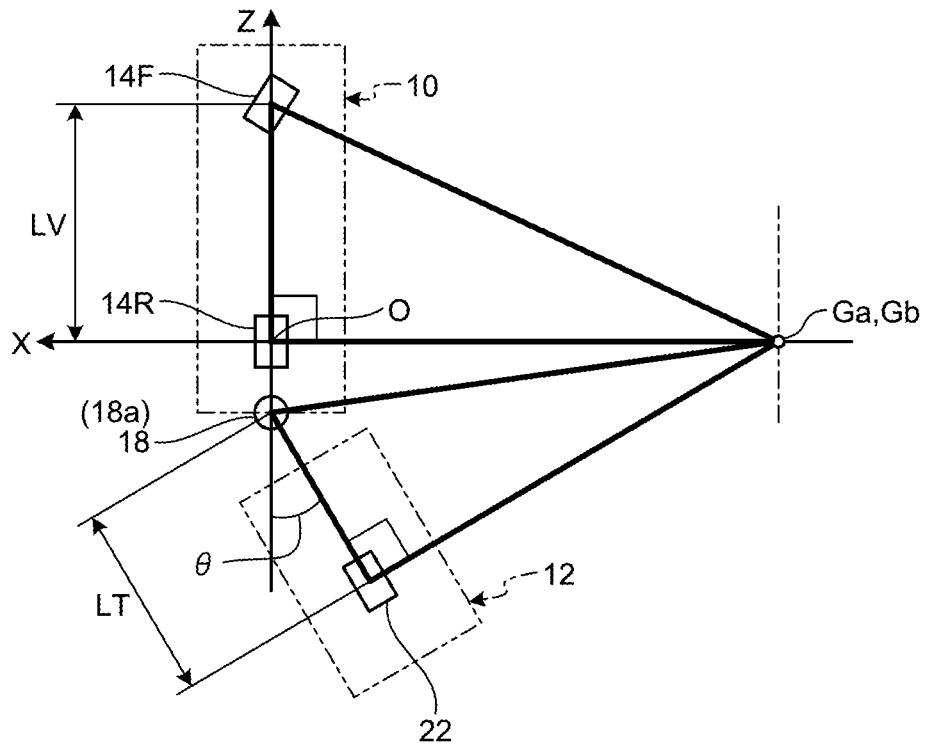
FIG. 10 is a schematic view for describing a case where a first turning center position of the towing vehicle coincides with a second turning center position of the towed vehicle, so that the towing vehicle and the towed vehicle are in a balance state in the traction assist apparatus according to the embodiment.

The balance determination unit 56b determines that the towing vehicle 10 and the towed vehicle 12 coupled by the traction device 18 are in the balance state when the towing vehicle 10 and the towed vehicle 12 are in the in-line state (for example, the coupling angle θ acquired by the coupling angle acquisition unit 54a=0°±2°). In addition, the balance determination unit 56b determines that the towing vehicle 10 and the towed vehicle 12 coupled by the traction device 18 are in the balance state when the first turning center position Ga and the second turning center position Gb calculated by the turning center position calculation unit 56a are the same position (the same coordinates) or can be regarded to be substantially the same position as illustrated in FIG. 10. That is, when the towing vehicle 10 is moved backward at the current steered angle, the balance determination unit 56b determines that the towed vehicle 12 is movable backward in the coupling posture maintaining the current coupling angle θ.

Figure 11:
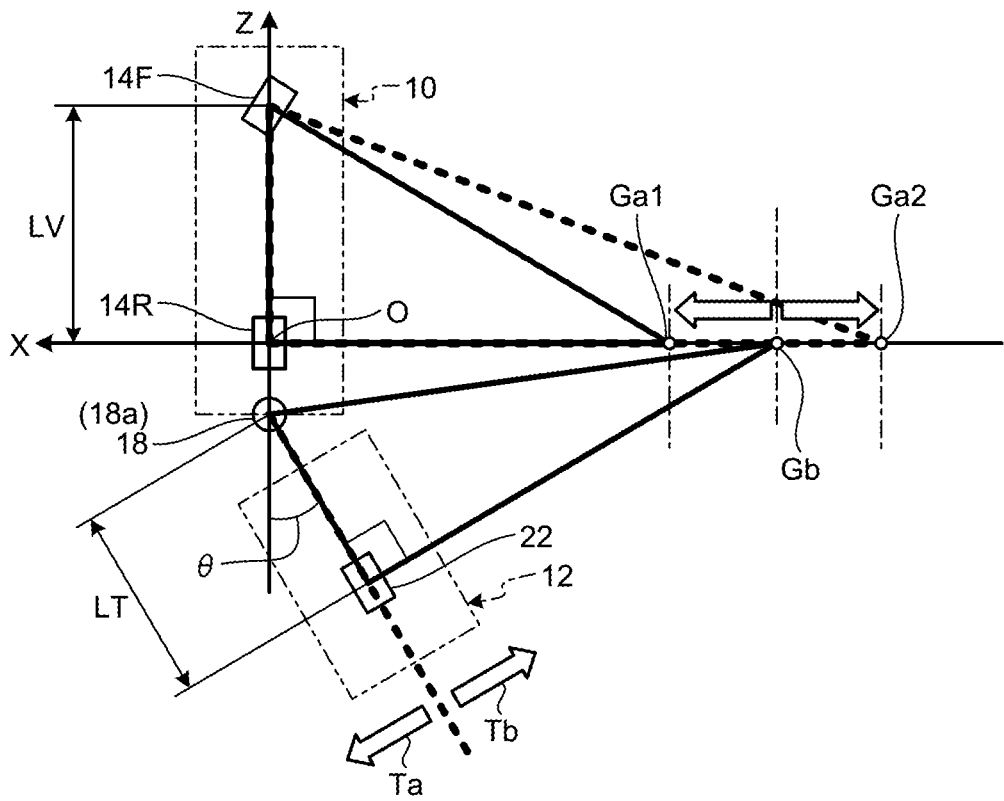
FIG. 11 is a schematic view for describing a case where the first turning center position of the towing vehicle does not coincide with the second turning center position of the towed vehicle, so that the towing vehicle and the towed vehicle are in an unbalance state in the traction assist apparatus according to the embodiment.

Conversely, as illustrated in FIG. 11, when the first turning center position Ga and the second turning center position Gb calculated by the turning center position calculation unit 56a are different from each other, the balance determination unit 56b determines that the towing vehicle 10 and the towed vehicle 12 coupled by the traction device 18 are in the unbalance state. The second turning center position Gb of the towed vehicle 12 is determined based on the coupling angle θ and the wheelbase length LT of the towed vehicle 12, as illustrated in FIG. 11. On the other hand, the towing vehicle 10 can freely change the steered angle by steering the steering unit 42. That is, it is possible to change the first turning center position Ga. For example, when the steering unit 42 is further rotated to the right (in the clockwise direction) from the state illustrated in FIG. 10, the towing vehicle 10 turns with a smaller turning radius than that in the case of FIG. 10. That is, the first turning center position Ga of the towing vehicle 10 moves on the X axis in FIG. 11 to the left in the drawing, and becomes a first turning center position Ga1, for example. Conversely, when the steering unit 42 is further rotated to the left (in the counterclockwise direction) from the state illustrated in FIG. 10, the towing vehicle 10 turns with a larger turning radius than that in the case of FIG. 10. That is, the first turning center position Ga of the towing vehicle 10 moves to the right in the drawing on the X axis in FIG. 11, and becomes a first turning center position Ga2, for example. When the towing vehicle 10 is moved backward to turn at the first turning center position Ga1, the towed vehicle 12 moves backward while changing the coupling posture in a direction Ta in which the current coupling angle θ decreases. In this case, the balance determination unit 56b determines that the towed vehicle 12 is not movable backward in the coupling posture where the current coupling angle θ is maintained. In addition, when the towing vehicle is moved backward to turn at the first turning center position Ga2, the towed vehicle 12 moves backward while changing the coupling posture in a direction Tb in which the current coupling angle θ increases. Even in this case, the balance determination unit 56b determines that the towed vehicle 12 is not movable backward in the coupling posture where the current coupling angle θ is maintained.

Accordingly, when the towing vehicle 10 and the towed vehicle 12 are coupled at the coupling angle θ, the balance state between the towing vehicle 10 and the towed vehicle 12 can be established by adjusting the steered angle of the towing vehicle 10. That is, it is possible to select a state where the behavior of the towed vehicle 12 accompanying the backward movement of the towing vehicle 10 can be easily recognized, by the steering of the steering unit 42.

When the current relationship between the towing vehicle 10 and the towed vehicle 12 is determined to be the balance state based on the determination result of the balance determination unit 56b and the signal indicating the intention to steer the towing vehicle 10 while maintaining the balance state is acquired from the assist request acquisition unit 54d, the monitoring control unit 56c executes balance monitoring control to monitor whether the balance state continues. For example, after the balance state has been determined, when a change in steered angle from the balance state is, for example, less than 5° and the vehicle speed of the towing vehicle 10 is no longer 0 km/h (when travel is started), the monitoring control unit 56c regards that a balance monitoring start condition is satisfied and thereby shifts to the balance monitoring mode. In another example, when the assist request acquisition unit 54d acquires, via the operation input unit 30, a signal representing that the driver or the like has performed a balance monitoring start operation (such as turning on a monitoring switch), the monitoring control unit 56c regards that the balance monitoring start condition is satisfied and thereby shifts to the balance monitoring mode. By providing the balance monitoring start condition in this manner, it is possible to avoid executing various notification due to the shift to the balance monitoring mode when continuous monitoring of the balance state is not desired, for example, when the steering unit 42 is simply steered. On the other hand, when a balance monitoring end condition is satisfied after the start of the balance monitoring, the monitoring control unit 56c ends the balance monitoring. For example, when the steering unit 42 is steered after the start of the balance monitoring such that a difference between a steered angle and the current steered angle of the towing vehicle 10 is a first reference value or more (for example, 15°), the monitoring control unit 56c regards that the driver has abandoned the balance state and intentionally changed a traveling direction of the towing vehicle 10 (the towed vehicle 12) and thus ends the balance monitoring.

Meanwhile, the towed vehicle 12 is a driven vehicle. Thus, the towed vehicle 12 is easily affected by a road surface state even if the driver keeps a steering angle (a steered angle) constant, and sometimes loses a posture and starts to turn due to an irregular state of the road surface or a variation in friction coefficient of the road surface. Similarly, there is a case where the towed vehicle 12 is more likely to lose the posture than the towing vehicle 10 and starts to turn even when receiving a crosswind or the like. In such a case, the monitoring control unit 56c determines whether to end or continue the balance monitoring. For example, it is assumed that a steering state of the steering unit 42 (the difference between the steered angle when the balance state is established and the current steered angle) is maintained (the first reference value is kept to be less than 15°) after the start of the balance monitoring, but a difference between a coupling angle θ when the towing vehicle 10 and the towed vehicle 12 are in the balance state and a current coupling angle θ has changed to a second reference value (for example, 10°) or more. In this case, the monitoring control unit 56c determines that the driver has no will to maintain the balance state without performing an operation of correcting the steered angle even though the towed vehicle 12 has started to turn, and ends the balance monitoring. On the other hand, when the steering state of the steering unit 42 is maintained in the balance state (the first reference value is kept to be less than 15°) and the difference between the coupling angle θ in the balance state between the towing vehicle 10 and the towed vehicle 12 and the current coupling angle θ is less than the second reference value, it is determined that the driver has a will to maintain the current state, that is, the will to continue the balance state, and the monitoring control unit 56c continues the balance monitoring such that the balance state can be restored at an early stage. The monitoring control unit 56c can end the balance monitoring when receiving driver's end request for the balance monitoring mode via the assist request acquisition unit 54d.

Figure 12:
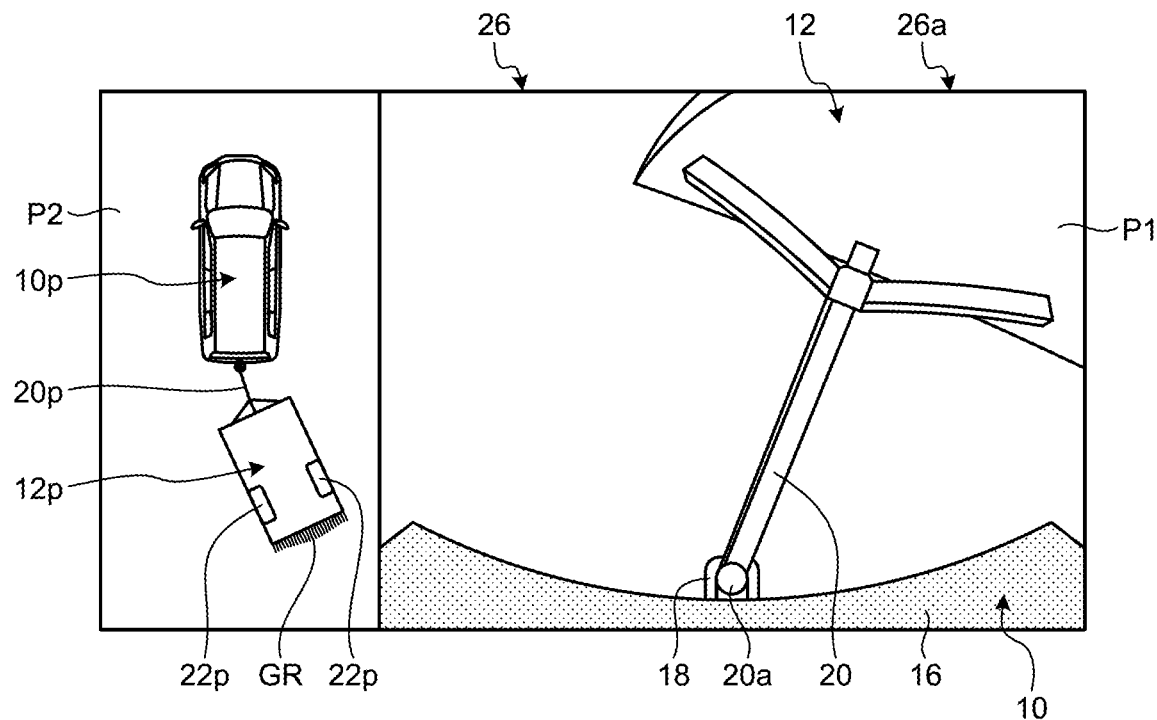
FIG. 12 is a schematic view illustrating an example of an image in which a real image and a bird's-eye view image illustrating the towing vehicle and the towed vehicle are displayed in a traction assist mode in the traction assist apparatus according to an embodiment.

The display processing unit 58 switches the screen 26a of the display device 26 from a normal screen (for example, a navigation screen or an audio screen) to a traction assist screen in the traction assist mode as illustrated in FIG. 12. In addition, the display processing unit 58 returns the screen 26a to the normal screen at the end of the traction assist mode. The display processing unit 58 includes a real image processing unit 58a, a bird's-eye view image processing unit 58b, and the like, each being configured to execute processing relating to display contents of the display device 26 and the display device 34. The display processing unit 58 can display a real image P1 and a bird's-eye view image P2 illustrating a coupling portion between the towing vehicle 10 and the towed vehicle 12 on one screen (the screen 26a) in order to make it easier to grasp the coupling state between the towing vehicle 10 and the towed vehicle 12 during execution of the traction assist mode, as illustrated in FIG. 12, for example.

The real image processing unit 58a generates the real image P1 to be displayed on the screen 26a of the display device 26 based on the captured image data imaged by the imaging unit 24. The real image P1 illustrated in FIG. 12 includes, as an example, the rear bumper 16 and the traction device 18 at the rear end of the towing vehicle 10, the distal end of the towed vehicle 12, the coupling member 20, the coupler 20a, and the like.

The bird's-eye view image P2 is an image of the towing vehicle 10 and the towed vehicle 12 in a bird's-eye view. The bird's-eye view image processing unit 58b reads, for example, a towing vehicle image 10p illustrating a bird's-eye view shape of the towing vehicle 10 and a towed vehicle image 12p illustrating a bird's-eye view shape of the towed vehicle 12 stored in advance in the ROM 40b or the SSD 40d. Then, the bird's-eye view image processing unit 58b generates the bird's-eye view image P2 displaying the towing vehicle image 10p and the towed vehicle image 12p, which are coupled by a coupling member image 20p and have the coupling angle θ corresponding to the actual coupling state, based on the coupling angle θ acquired by the coupling angle acquisition unit 54a. The towed vehicle 12 having various specifications can be coupled to the towing vehicle 10. Therefore, when the towed vehicle image 12p is displayed in the bird's-eye view image P2, the bird's-eye view image processing unit 58b can generate the towed vehicle image 12p representing the bird's-eye view shape of the towed vehicle 12 in a simple manner based on the wheelbase length LT of the towed vehicle 12 acquired by the specification acquisition unit 54c and the coupling angle θ acquired by the coupling angle acquisition unit 54a. The towing vehicle image 10p and the towed vehicle image 12p are coupled by the coupling member image 20p based on the coupling angle θ. In this case, it is difficult to acquire (estimate) information on a length at the rear of the wheelbase length LT of the towed vehicle image 12p, that is, a length behind a trailer wheel image 22p. Thus, gradation processing GR for gradual assimilation with a background color, for example, is performed at the rear of the trailer wheel image 22p of the towed vehicle image 12p such that it is possible to avoid display of inaccurate information.

Since the real image P1 representing the periphery of the coupling portion between the towing vehicle 10 and the towed vehicle 12 and the bird's-eye view image P2 representing the towing vehicle image 10p and the towed vehicle image 12p are displayed on one screen in this manner, it is possible to objectively present the coupling state (coupling angle θ) between the towing vehicle 10 and the towed vehicle 12. As a result, the driver can easily grasp the angle (a posture) of the towed vehicle 12, and can easily determine whether the towed vehicle 12 is desirably moved to the left or right, or steered to the left or right at the time of controlling the angle of the towed vehicle 12. The example in which the towed vehicle image 12p is subjected to gradation processing GR is illustrated in the example of FIG. 12, but the towed vehicle image 12p may be displayed up to the trailer wheel image 22p. In addition, only a front end of the towed vehicle image 12p may be illustrated as a more simplified mode. Conversely, the towed vehicle image 12p having a predetermined shape that is not subjected to the gradation processing GR may be displayed, and more detailed information, such as a total length of the towed vehicle 12, may be input when the specification is input to generate the towed vehicle image 12p illustrating the whole. When the towing vehicle 10 and the towed vehicle 12 include a plurality of imaging units that capture a peripheral situation, a plurality of pieces of captured image data may be combined to generate a periphery bird's-eye view image illustrating the periphery of the towing vehicle 10 and the towed vehicle 12. Then, the towing vehicle image 10p and the towed vehicle image 12p may be displayed to be superimposed on the generated periphery bird's-eye view image. In this case, the bird's-eye view image P2 can display a positional relationship with an object (for example, another vehicle) existing around the towing vehicle image 10p and the towed vehicle image 12p in a more easily understandable state.

In the example of FIG. 12, a display region of the real image P1 is made larger than a display region of the bird's-eye view image P2 on the display device 26. Alternatively, the bird's-eye view image P2 may be displayed to be larger than the real image P1. In this case, the coupling between the towing vehicle 10 and the towed vehicle 12 can be displayed more easily. Furthermore, the real image P1 may be displayed on the display device 26, and the bird's-eye view image P2 may be displayed on the display device 34. In this case, it is possible to secure the wide display region of the real image P1, and the visibility of the real image P1 can be improved.

The notification unit 60 executes visual notification using an icon, a mark, or the like or auditory notification using with sound for information, such as whether the coupling state between the towing vehicle 10 and the towed vehicle 12 is the balance state, based on the processing result of the monitoring unit 56. In order to realize this process, the notification unit 60 includes modules such as an indicator control unit 60a, a display mode control unit 60b, and a sound mode control unit 60c.

Figure 13:
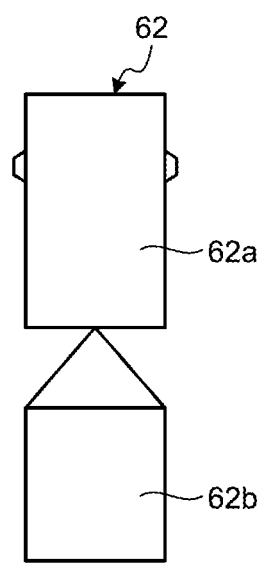
FIG. 13 is a schematic view illustrating examples of icons which can be used at the time of providing notification of the balance or providing notification of a balance monitoring mode, the examples of icons which can be used when the towing vehicle and the towed vehicle are in an in-line state in the traction assist apparatus according to the embodiment.
Figure 14:
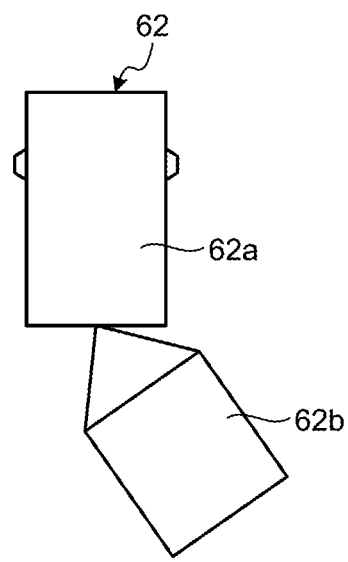
FIG. 14 is a schematic view illustrating examples of icons which can be used at the time of providing notification of the balance or providing notification of the balance monitoring mode, the examples of icons which can be used when the towed vehicle turns right with respect to the towing vehicle in the traction assist apparatus according to the embodiment.
Figure 15:
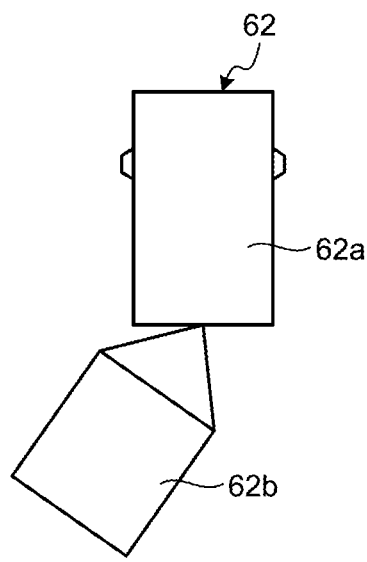
FIG. 15 is a schematic view illustrating examples of icons which can be used at the time of providing notification of the balance or providing notification of the balance monitoring mode, the examples of icons which can be used when the towed vehicle turns left with respect to the towing vehicle in the traction assist apparatus according to the embodiment.
Figure 16:
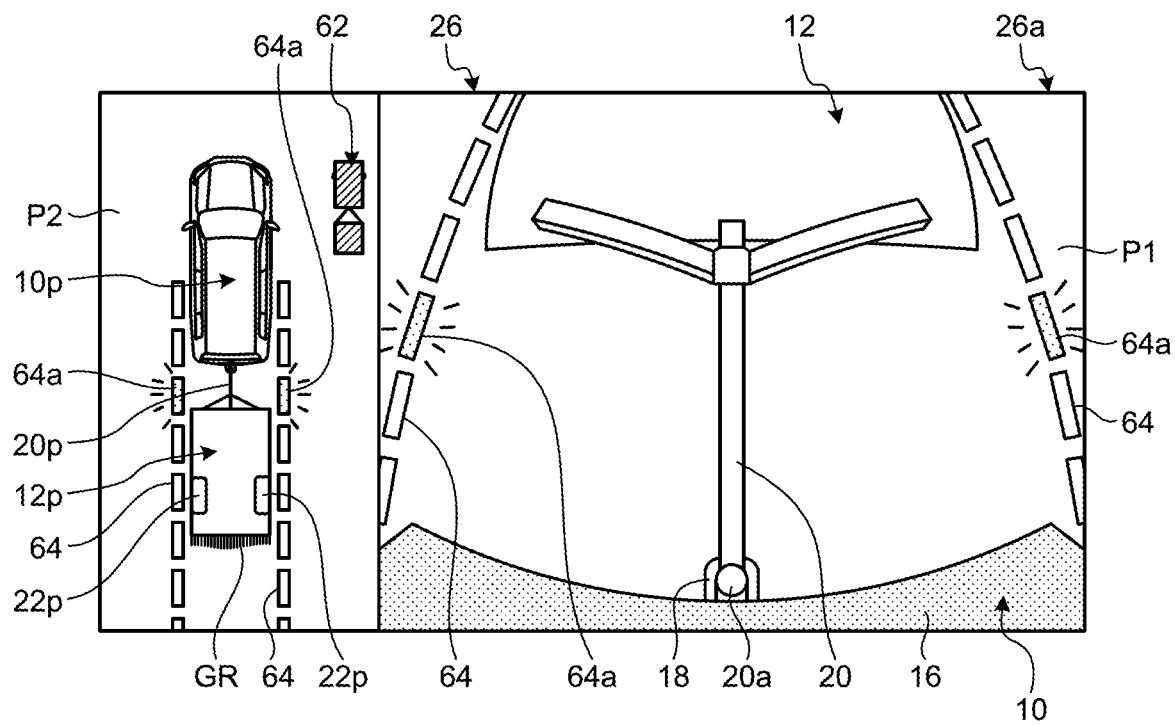
FIG. 16 is a schematic view illustrating an example of an image in a case where the balance state is established when the towing vehicle and the towed vehicle are in the in-line state and the balance notification has been executed in the traction assist apparatus according to the embodiment.

The indicator control unit 60a reads an icon, a mark, or the like indicating a current state from a storage device, such as the ROM 40b and the SSD 40d, based on the coupling angle θ acquired by the coupling angle acquisition unit 54a and the determination result of the balance determination unit 56b, and displays the read ones on the bird's-eye view image P2, for example. As an example, FIGS. 13 to 15 illustrate a balance icon 62 that is displayed when the coupling state between the towing vehicle 10 and the towed vehicle 12 is the "balance state". The balance icon 62 can be constituted by, for example, a tractor icon 62a corresponding to the towing vehicle 10 and a trailer icon 62b corresponding to the towed vehicle 12, and is lit up, for example, in the "balance state". The balance icon 62 illustrated in FIG. 13 is an icon that is displayed when the tractor icon 62a and the trailer icon 62b are almost straight (in an in-line state) in the balance state with a coupling angle≈0. The balance icon 62 illustrated in FIG. 14 is an icon that is displayed when the towed vehicle 12 turns right with respect to the towing vehicle 10 and enters the "balance state", and the trailer icon 62b is inclined to the right with respect to the tractor icon 62a. Similarly, the balance icon 62 illustrated in FIG. 15 is an icon that is displayed when the towed vehicle 12 turns left with respect to the towing vehicle 10 and enters the "balance state", and the trailer icon 62b is inclined to the left with respect to the tractor icon 62a. These balance icons 62 are examples, and only the balance icons 62 in the in-line state illustrated in FIG. 13, for example, may be used and a mark indicating that the balance icon 62 is a different icon may be attached to the tractor icon 62a and the trailer icon 62b. For example, a mark "S" is superimposed onto the trailer icon 62b in the case of the balance in the "in-line state" as illustrated in FIG. 13. In addition, a mark "R" may be superimposed onto the trailer icon 62b in the case of the balance in the "right turn state" as illustrated in FIG. 14, and a mark "L" may be superimposed onto the trailer icon 62b in the case of the balance in the "left turn state" as illustrated in FIG. 15. As illustrated in FIG. 16, the balance icon 62 can be displayed, for example, on a part (for example, the upper right) of the bird's-eye view image P2 of the display device 26.

In the examples of FIGS. 14 and 15, an icon is displayed, which has a constant inclination regardless of the coupling angle θ between the towing vehicle 10 and the towed vehicle 12 in the balance state. In another embodiment, a balance icon 62 may be read out, which includes the trailer icon 62b having an inclination corresponding to the coupling angle θ acquired by the coupling angle acquisition unit 54a, or a balance icon 62 may be generated, in which the trailer icon 62b displayed with the inclination corresponding to the coupling angle θ and the tractor icon 62a are combined.

Figure 17:
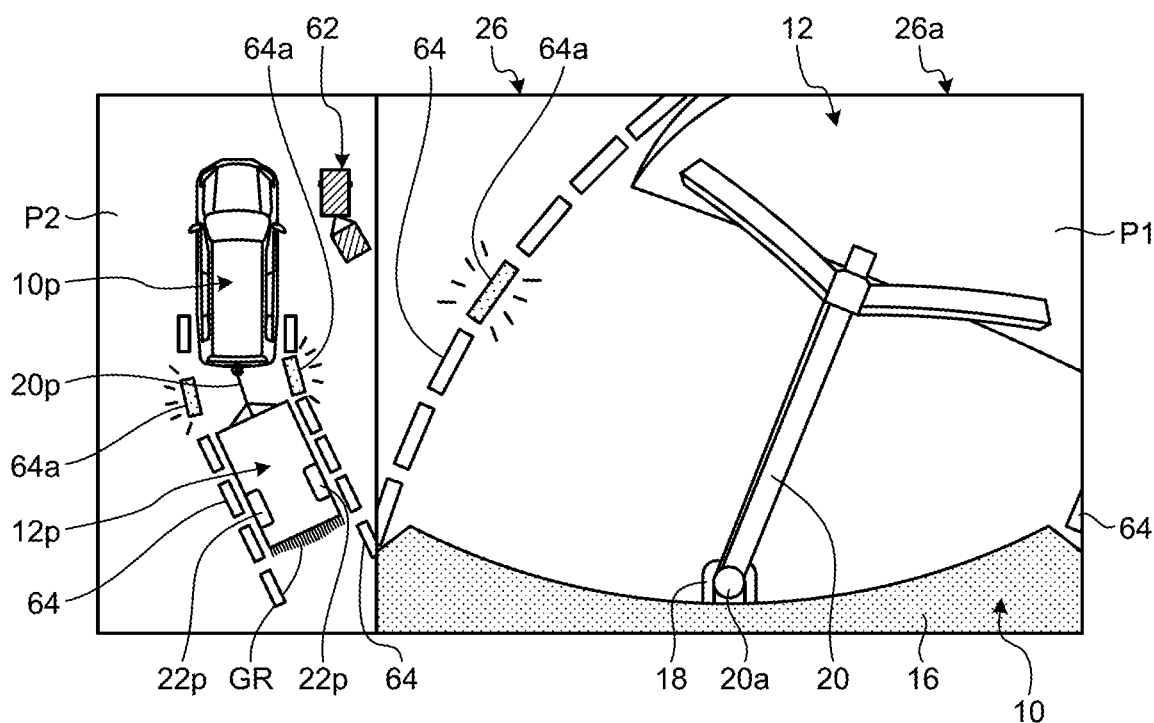
FIG. 17 is a schematic view illustrating an example of an image in a case where the balance state is established when the towing vehicle and the towed vehicle are not in the in-line state and the balance notification has been executed in the traction assist apparatus according to the embodiment.

In addition, when the towing vehicle 10 and the towed vehicle 12 are in the balance state, the indicator control unit 60a may display a balance mark 64 that further emphasizes the balance state, as illustrated in FIG. 16. The balance mark 64 can be constituted by, for example, a linear mark along right side surfaces of the towing vehicle image 10p and the towed vehicle image 12p and a linear mark along left side surfaces of the towing vehicle image 10p and the towed vehicle image 12p. In FIG. 16, the balance mark 64, which is in the form of a broken line, is displayed in the bird's-eye view image P2 when the towing vehicle 10 and the towed vehicle 12 are in the balance state. In addition, FIG. 17 illustrates an example in which the balance mark 64, which is displayed when the balance state is established with a posture where the towed vehicle 12 turns right with respect to the towing vehicle 10, is displayed in the bird's-eye view image P2. In this case, the balance mark 64 is displayed in the form of being curved (or bent) to the right in accordance with the coupling posture of the towing vehicle 10 and the towed vehicle 12. The driver can easily recognize that the current coupling state between the towing vehicle 10 and the towed vehicle 12 is the "balance state" by visually recognizing the balance mark 64 displayed on the side surfaces of the towing vehicle image 10p and the towed vehicle image 12p.

The indicator control unit 60a may display the balance mark 64 to be superimposed along the side surfaces of the towing vehicle 10 and the towed vehicle 12 in the real image P1 as illustrated in FIGS. 16 and 17. In this case, it is possible to allow the driver to more easily recognize the "balance state". In FIGS. 16 and 17, the two balance marks 64 are displayed along the left and right side surfaces of the towing vehicle image 10p (the towing vehicle 10) and the towed vehicle image 12p (the towed vehicle 12). In another embodiments, one balance mark may be displayed along a vehicle center line extending in the front-rear direction of the towing vehicle image 10p (the towing vehicle 10) and a vehicle center line extending in the front-rear direction of the towed vehicle image 12p (the towed vehicle 12). In this case, the display content of the screen 26a is simplified, which can contribute to improvement in visibility.

Figure 18:
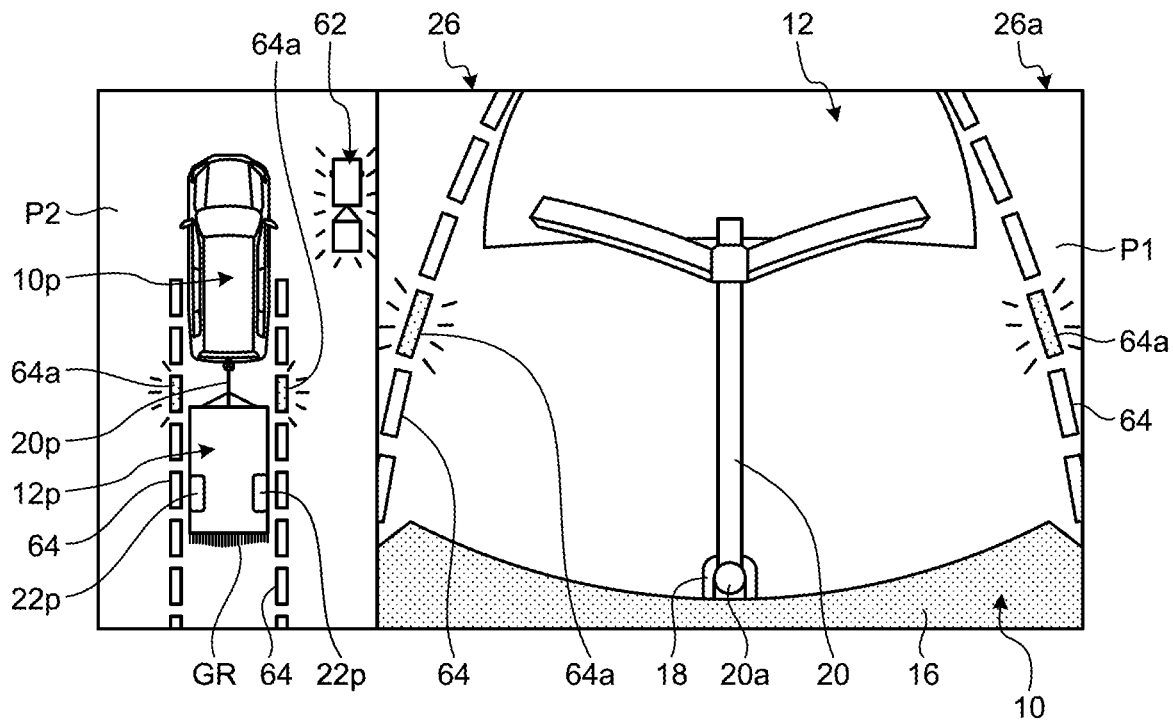
FIG. 18 is a schematic view illustrating an example of an image when the mode further shifts to the balance monitoring mode in the state illustrated in FIG. 16.

The display mode control unit 60b changes display modes of the balance icon 62 and the balance mark 64 displayed by the indicator control unit 60a based on the determination result of the balance determination unit 56b. For example, regarding the balance icon 62, the display mode is set to lighting display as illustrated in FIGS. 16 and 17 when the "balance state" is established. In addition, when shifting to the "balance monitoring mode", the balance icon 62 is displayed to blink as illustrated in FIG. 18. In another embodiment, the display mode control unit 60b may change a display color of the balance icon 62 or change a luminance between the case where the balance state is established and the case of shifting to the "balance monitoring mode".

In addition, regarding the balance mark 64, the display mode control unit 60b may light up the balance mark 64 when the balance state is established, and may change the display mode such that, for example, a bright spot 64a moves (flows) along the balance mark 64 so as to emphasize the balance state. The bright spot 64a may move in one direction (for example, backward), and may resume the movement from a start point when moving to a terminal end of the balance mark 64. The single bright spot 64a may be provided for each of the balance marks 64, or a plurality of the bright spots 64a may be displayed at regular intervals. There is a case where it is difficult to know whether the "balance state" is established unless the towing vehicle 10 and the towed vehicle 12 are actually moved backward to confirm the behavior of the towed vehicle 12. However, it becomes easier for the driver to intuitively recognize that the current state is the "balance state" by moving the bright spot 64a as described above. The example in which the balance mark 64 and the bright spot 64a are also displayed in the real image P1 is illustrated in the display examples in FIGS. 16 to 18, but whether to display the balance mark 64 or the bright spot 64a can be selected by the driver using the operation input unit or the like. When the balance mark 64 and the bright spot 64a is hidden, it is possible to simplify the display content of the real image P1 as compared with the case of displaying the balance mark 64 and the bright spot 64a, and to improve the visibility of the peripheral situation.

Figure 19:
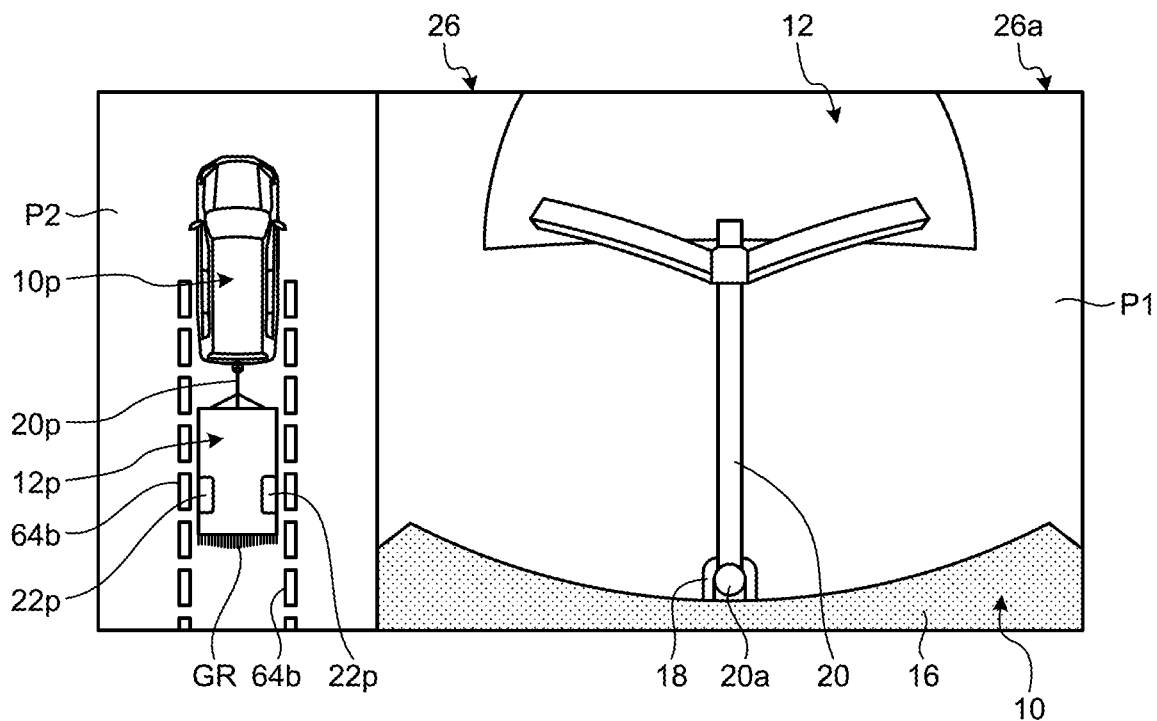
FIG. 19 is a schematic view illustrating an example of an image in a case where the towing vehicle and the towed vehicle are in the in-line state when the balance state is not established and an in-line notification has been executed in the traction assist apparatus according to the embodiment.

In the above-described example, the display mode control unit 60b displays the balance mark 64 when the balance state is established. In another embodiment, the display mode control unit 60b may execute an "in-line notification" to display an in-line mark 64b in a display mode different from that in the "balance state" when the towing vehicle 10 and the towed vehicle 12 are not in the balance state but in the "in-line state" as illustrated in FIG. 19. For example, the display mode control unit 60b sets a display color of the balance mark 64 to "green" in the case of indicating the "balance state", and sets the display color of the linear (broken-line) in-line mark 64b to "blue" to be distinguished in the case of indicating the in-line state. By providing the notification that the towed vehicle 12 is in the in-line state with respect to the towing vehicle 10 when the balance state is not established, it is possible to make it easy to intuitively recognize that the towing vehicle 10 is straight with respect to the towed vehicle 12, for example, in the case of moving the towed vehicle 12 to a predetermined space, such as a parking space. Further, it is possible to make it easy to examine how to move the towing vehicle 10 from such a state. When the "balance state" is established during the "in-line notification", the display mode control unit 60b may change the display from the in-line mark 64b to the balance mark 64, may display the in-line mark 64b and the balance mark 64, or may display both the in-line mark 64b and the balance mark 64 in different display colors. In addition, the display mode control unit 60b may display the "in-line notification" and the "balance state" with different line types or the like for distinction. When the in-line mark 64b is displayed, the balance icon 62 and the bright spot 64a are not displayed.

The sound mode control unit 60c changes a notification sound according to the determination result of the balance determination unit 56b and the presence or absence of shift to the balance monitoring mode of the monitoring control unit 56c. For example, the sound mode control unit 60c changes a type of beep sound to be output in accordance with a situation. When the "balance state" is established, a simple short sound, such as "blip", may be output. In addition, when shifting to "balance monitoring mode", an emphasis sound, such as "plunk", may be output. In addition, when the "balance monitoring mode" is ended, a long sound, such as "bleep", may be output to call attention. In addition, a warning sound such as "blip-blip" may be output when the balance state collapses and attention is called to restore the balance although the "balance monitoring mode" is continued. The sound output by the sound mode control unit 60c is not limited thereto, and can be set as appropriate as long as a change in each situation can be recognized. The setting can be changed, for example, via the operation input unit 30. In addition, the sound mode control unit 60c may output a voice message providing notification of the situation at that time instead of or in addition to the notification using the beep sound.

Figure 20:
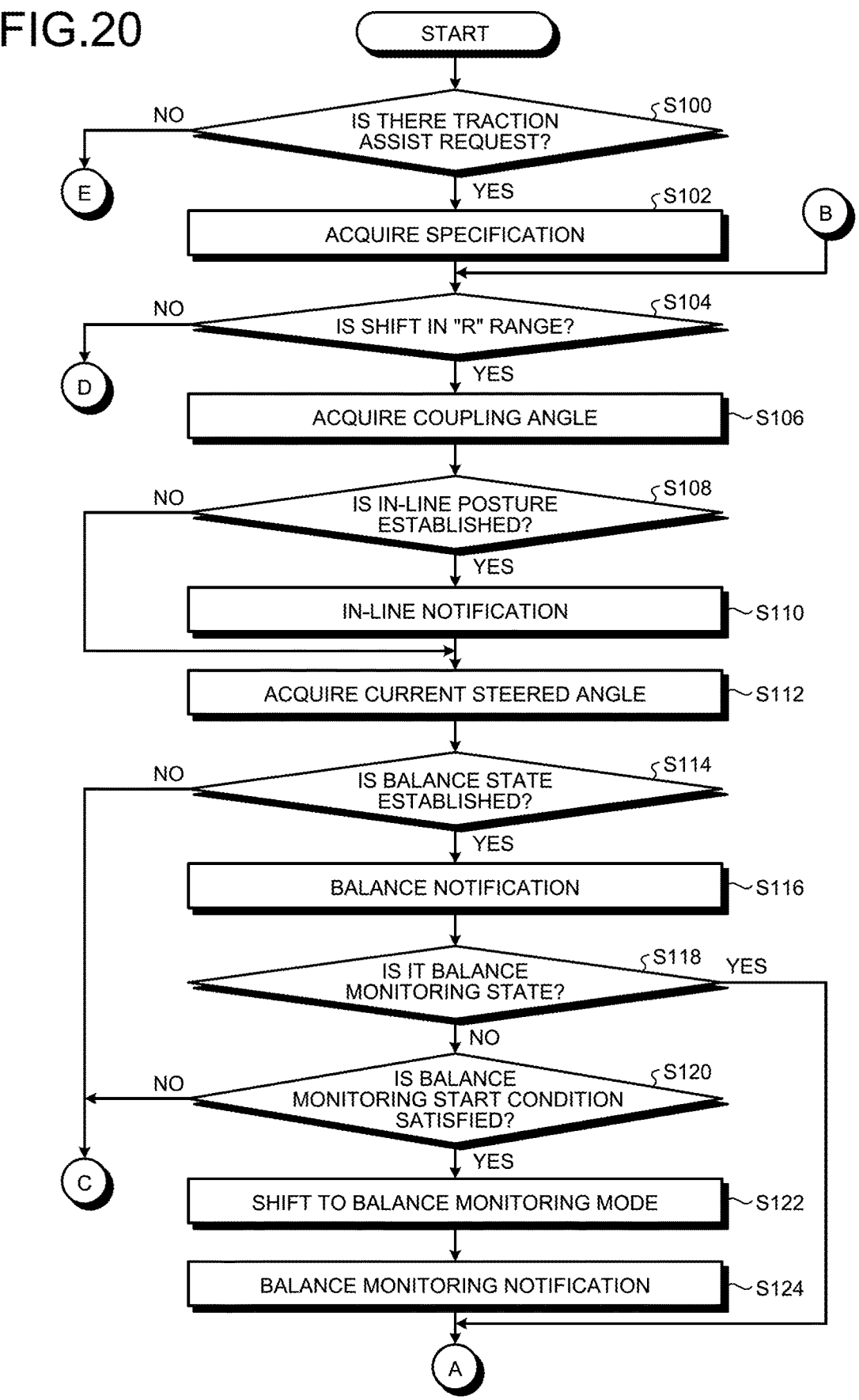
FIG. 20 is a flowchart illustrating the first half of an example of a procedure of a notification process performed by the traction assist apparatus according to the embodiment.
Figure 21:
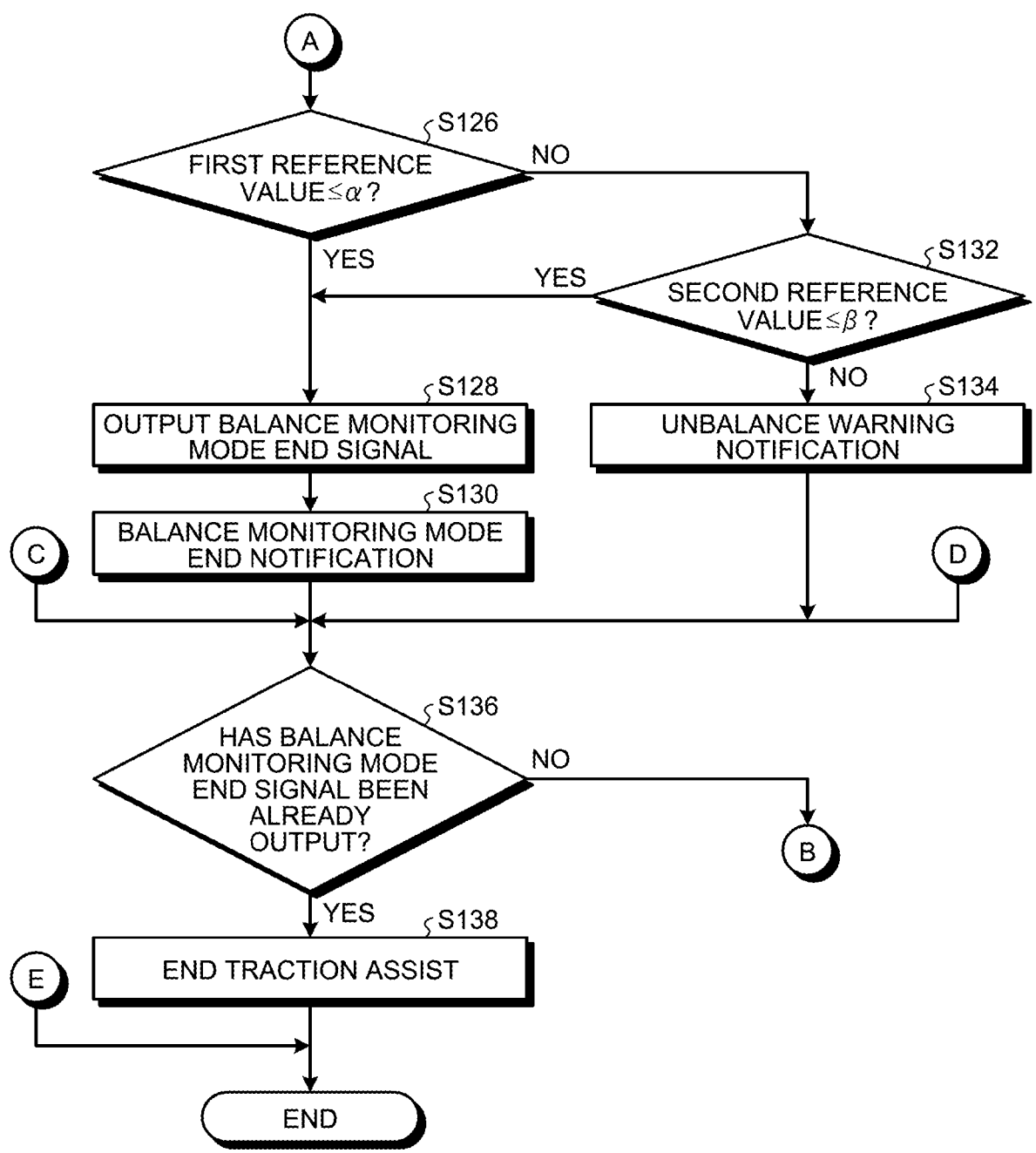
FIG. 21 is a flowchart illustrating the second half of the example of the procedure of the notification process performed by the traction assist apparatus according to the embodiment.

Details of a notification process performed by the traction assist apparatus (traction assist system 100) configured as described above will be described based on the flowcharts of FIGS. 20 and 21. FIG. 20 is a flowchart for describing the first half of the process. FIG. 21 is a flowchart for describing the second half of the process.

First, the assist request acquisition unit 54d confirms whether an execution request for traction assist to execute the "balance notification" or the "balance monitoring mode" has been made (S100). When the execution request for traction assist (a traction assist mode) has been made via the operation input unit 30 (Yes in S100), the specification acquisition unit 54c acquires the specifications of the towing vehicle 10 and the towed vehicle 12 (S102). For example, the wheelbase length LV of the towing vehicle 10 and the wheelbase length LT of the towed vehicle 12 are acquired. The wheelbase length LT may be acquired by using the value input by the driver via the operation input unit 30, or estimating when the towing vehicle 10 and the towed vehicle 12 move forward turning in the state of being coupled at the coupling angle θ as described with reference to FIG. 9. In addition, the specification acquisition unit 54c acquires, for example, the wheelbase length LV, the hitch distance LC, and the like of the towing vehicle 10 stored in advance from the ROM 40b and the SSD 40d. The presence or absence of the coupling of the towed vehicle 12 can be detected by the imaging unit 24 and other sensors, and the like in the traction assist system 100 as described above. At this time, if the coupling of the towed vehicle 12 is not detected, the assist request acquisition unit 54d may invalidate the request and temporarily end this flow even when the execution request for traction assist (a traction assist mode) has been made via the operation input unit 30.

The processes of S100 and S102 may be performed when the towed vehicle 12 is coupled to the towing vehicle 10, for example, before the towing vehicle 10 starts to travel.

As described above, the information on whether the towing vehicle 10 and the towed vehicle 12 are in the balance state is useful when the towing vehicle 10 to which the towed vehicle 12 is coupled moves backward. When information representing the shift to a reverse travel range (R range) has been received via the assist request acquisition unit 54d (Yes in S104), the CPU 40a acquires the coupling angle θ between the towing vehicle and the towed vehicle 12 via the coupling angle acquisition unit 54a (S106). The coupling angle acquisition unit 54a acquires, for example, the coupling angle θ by performing image processing on an image based on captured image data imaged by the imaging unit 24. In addition, the display processing unit 58 switches the screen 26a of the display device 26 from, for example, the navigation screen or the audio screen, which is the normal screen, to the traction assist screen in the traction assist mode as illustrated in FIG. 12. At this time, when the towing vehicle 10 and the towed vehicle 12 are in the in-line posture (for example, the in-line state: the coupling angle θ=0°±2°) (Yes in S108), the indicator control unit 60a executes the in-line notification by reading display data for displaying the in-line mark 64b from the ROM 40b or the like, and displaying the in-line mark 64b to be superimposed on the bird's-eye view image P2 via the display control unit 40e as illustrated in FIG. 19 (S110). Since the in-line mark 64b and the balance mark 64 can have substantially the same shape as described above, the display mode control unit 60b performs the process of setting the display mode for the in-line mark 64b, for example, the display color to "blue". In addition, the sound mode control unit 60c may output the notification sound indicating the "in-line state", for example, "pop" or the like, via the sound control unit 40f. When the in-line state is not established in S108 (No in S108), the process of S110 is skipped.

Subsequently, the steered angle acquisition unit 54b acquires a current steered angle of the towing vehicle 10 from the steered angle sensor 44 (S112). Then, the balance determination unit 56b determines whether the towing vehicle 10 and the towed vehicle 12 are currently in the balance state (S114). That is, it is determined whether the current steered angle of the towing vehicle 10 is a balance steered angle which enables the vehicle to move backward in the state of maintaining the current coupling posture (coupling angle θ) of the towed vehicle 12 or is an unbalance steered angle which prohibits the backward movement in the coupling posture. Specifically, the turning center position calculation unit 56a calculates the first turning center position Ga of the towing vehicle 10 based on the wheelbase length LV and the current steered angle of the towing vehicle 10, and calculates the second turning center position Gb of the towed vehicle 12 based on the wheelbase length LT of the towed vehicle 12 and the coupling angle θ. Then, the balance determination unit 56b determines the balance state based on whether the first turning center position Ga coincides with the second turning center position Gb. When the towing vehicle 10 and the towed vehicle 12 are in the balance state, that is, when the first turning center position Ga coincides with the second turning center position Gb (Yes in S114), the notification unit 60 executes the "balance notification" (S116). The balance determination unit 56b also determines that the "balance state" is established even when the towing vehicle 10 and the towed vehicle 12 are in the in-line state and the steered angle is substantially at the neutral position (steered angle≈0°), and the notification unit 60 executes the "balance notification". For example, the indicator control unit 60a reads the display data of the balance icon 62 corresponding to the coupling state from the ROM 40b based on the current coupling angle θ acquired by the coupling angle acquisition unit 54a. The display mode control unit 60b reads the display data to display the balance mark 64 from the ROM 40b. Then, the balance icon 62 and the balance mark 64 are displayed on the bird's-eye view image P2 as illustrated in FIG. 16 or 17 via the bird's-eye view image processing unit 58b and the display control unit 40e. In addition, the display mode control unit 60b changes the display mode such that the bright spot 64a moves with respect to the balance mark 64. Furthermore, the sound mode control unit 60c outputs the notification sound indicating that the "balance state" is established, for example, "blip", via the sound control unit 40f.

In the balance state, the monitoring control unit 56c confirms whether a current control state (control mode) is a balance monitoring state (has shifted to the balance monitoring mode) (S118), and shifts the mode to the balance monitoring mode (S122) when it is not the balance monitoring state (No in S118) and the balance monitoring start condition is satisfied (Yes in S120). For example, when the change (difference) in steered angle from the balance state is less than 5°, for example, after the balance state has been determined and the vehicle speed of the towing vehicle 10 is no longer 0 km/h (when travel is started), the monitoring control unit 56c regards that the balance monitoring start condition is satisfied and shifts the mode to the balance monitoring mode. In addition, in another example, when the balance monitoring start operation is performed by the driver or the like via the operation input unit 30 (the monitoring switch is turned on, or the like), it is regarded that the balance monitoring start condition is satisfied, and the monitoring control unit 56c may shift to the balance monitoring mode. Then, the notification unit 60 executes a balance monitoring notification (S124). For example, the display mode control unit 60b changes the display mode of the balance icon 62 displayed when the balance state is established. For example, the display of the balance icon 62 is changed from a lighting state to a blinking state, the display color is changed, or the luminance or the transparency is changed. In addition, the sound mode control unit 60c outputs the notification sound indicating the shift to the "balance monitoring mode", for example, "plunk", via the sound control unit 40f. Since the notification unit 60 changes the notification mode in this manner, the driver can easily recognize that the mode has shifted to the balance monitoring mode. From then, the necessity of gazing at the display device 26 and the like is reduced until the next action of the traction assist system 100 occurs, and it becomes easier to concentrate on operating the towing vehicle 10 and grasping the peripheral situation. When the state has already shifted to the balance monitoring state (balance monitoring mode) in S118 (Yes in S118), the processes of S120 to S124 are skipped.

Subsequently, when the steering unit 42 is steered during the shift to the balance monitoring mode, and a variation angle α of the steered angle of the towing vehicle 10 (a difference between the steered angle when the balance state is established and the current steered angle) becomes the first reference value (for example, 15°) or more with reference to the steered angle when the balance state is established (Yes in S126), the monitoring control unit 56c regards that the driver has abandoned the balance state and has intentionally changed the traveling direction of the towing vehicle 10 (the towed vehicle 12). Then, the monitoring control unit 56c outputs a balance monitoring mode end signal to end the balance monitoring (S128). In addition, the notification unit 60 executes a balance monitoring mode end notification (S130). For example, the display mode control unit 60b changes the display mode of the balance icon 62 or the balance mark 64 displayed on the bird's-eye view image P2 from the blinking state indicating the balance monitoring mode to the lighting state indicating the unbalance monitoring mode. At this time, when the towing vehicle 10 (the towed vehicle 12) is stopped, the balance state is sometimes maintained, but the balance monitoring mode is temporarily ended. In addition, the sound mode control unit 60c outputs the notification sound to provide notification of the end of the balance monitoring mode, for example, "bleep". Since the end of the balance monitoring mode is visually and audibly provided in notification in this manner, the driver can gaze the display device 26 again and become easily aware of performing continuation of the states of the towing vehicle 10 and the towed vehicle 12 and the peripheral state. In addition, it is possible to avoid the end of the balance monitoring mode without being noticed.

In S126, when the steering state of the steering unit 42 is maintained (the variation angle α is kept less than first reference value=15°) (No in S126), a change in the coupling angle θ between the towing vehicle 10 and the towed vehicle 12 after the establishment of the balance state (difference between the coupling angle θ when the balance state is established and the current coupling angle θ: a variation angle β) is confirmed (S132). For example, when the variation angle β changes to the second reference value (for example, 10°) or more (Yes in S132), the monitoring control unit 56c determines that the driver has no will to maintain the balance state without performing the operation of correcting the steered angle even though the towed vehicle 12 has started to turn significantly, and shifts to the process of S128. That is, the balance monitoring is ended. On the other hand, when the variation angle β is less than the second reference value (for example, 10°) (No in S132), it is determined that the driver has no will to abandon the balance state, that is, has the will to continue the balance state, and the monitoring control unit 56c continues the balance monitoring such that the balance state can be restored at an early stage. In this case, for example, the notification unit 60 executes an unbalance warning notification so as to prompt the steering of the steering unit 42 and the temporary stop of the towing vehicle 10 (the towed vehicle 12) (S134). For example, the sound mode control unit 60c outputs the warning sound, for example, "blip-blip" or the like, via the sound control unit 40f as the unbalance warning notification. In addition, the display mode control unit 60b may change the display mode of the balance icon 62 or the balance mark 64 so as to indicate that the balance state has collapsed or is collapsing. For example, the display color may be set to "yellow" or the like to call attention. In addition, the display mode of the towing vehicle image 10p or the towed vehicle image 12p may be changed. For example, the blinking display may be performed, or the display color may be changed.

When the balance monitoring mode end signal has already been output (Yes in S136), the monitoring control unit 56c ends the traction assist (S138). For example, the display processing unit 58 switches the display state of the display device 26 to the normal display state, for example, the navigation screen or the audio screen. Even when the assist request acquisition unit 54d receives a request signal to request the traction assist end from the driver via the operation input unit 30 or the like, the monitoring control unit 56c can output the balance monitoring mode end signal to end the traction assist.

In S136, when the balance monitoring mode end signal has not been output (No in S136), the process proceeds to S104, and the monitoring control unit 56c continuously performs the balance monitoring including confirmation on the in-line state or the balance state. In addition, when the balance monitoring start condition is not satisfied in S120 (No in S120), or when the "balance state" is not established in S114 (No in S114), the process proceeds to S136 to execute the determination process on whether to end the traction assist. In S104, when it is difficult to acquire the information from the shift sensor 46 representing that the speed-change operation unit 52 (a shift lever) has shifted to the reverse travel range (R range) via the assist request acquisition unit 54d from the request for traction assist (No in S104), the process proceeds to S136 to execute the determination process on whether to end the traction assist. When the assist request acquisition unit 54d has not received the execution request for traction assist to execute the "balance notification" or the "balance monitoring mode via the operation input unit 30 in S100, this flow is temporarily ended.

The flowcharts illustrated in FIGS. 20 and 21 are examples. The processing steps can be exchanged, increased, or decreased as appropriate as long as it is possible to inform whether the towing vehicle 10 and the towed vehicle 12 are in the balance state and whether the mode is shifting to the balance monitoring mode, and the same effect can be obtained.

In this manner, according to the traction assist system 100 of the present embodiment, it is easy for the driver to intuitively recognize whether the towing vehicle 10 and the towed vehicle 12 are in the balance state and whether the mode is shifting to the balance monitoring mode for monitoring the state using the balance icon 62, the balance mark 64, the bright spot 64a, and the like displayed on the display device 26, and the corresponding notification sounds. In addition, after shifting to the balance monitoring mode, the necessity to gaze the display device 26 and the like is mitigated until the end of the balance monitoring mode is provided in notification, and it becomes easy to concentrate on operating the towing vehicle 10 and grasping the peripheral situation.

In the above embodiment, the balance icon 62, the balance mark 64, and the like are displayed on the screen 26a of the display device 26. Alternatively, the display corresponding to the towing vehicle image 10p, the towed vehicle image 12p, the balance icon 62, the balance mark 64, and the like may be performed by using an indicator constituted by an LED and the like without using the screen 26a, and the same effect can be obtained. In the above-described example, the visual notification using the display device 26 and the auditory notification using the sound output device 28 are used as the notification method. As another example, notification may be performed by vibrating a member that can come into contact with the driver, such as the steering unit 42, and the same effect can be obtained.

The traction assist program to be executed by the CPU 40a of the present embodiment may be configured to be provided in the state of being recorded in a computer-readable recording medium such as a CD-ROM, a flexible disk (FD), a CD-R, and a digital versatile disk (DVD) as a file in an installable or executable format.

Furthermore, the traction assist program may be configured to be stored on a computer coupled to a network such as the Internet and to be provided by download via a network. In addition, the traction assist program to be executed in the present embodiment may be configured to be provided or distributed via a network such as the Internet.

Although the embodiments and modifications of the present invention have been described, these embodiments and modifications are presented as examples and are not intended to limit the scope of the invention. These novel embodiments can be implemented in various other modes, and various omissions, substitutions, and alterations can be made within a scope not departing from a gist of the invention. These embodiments and modifications thereof are included in the scope and the gist of the invention, and are included in the invention described in the claims and the equivalent scope thereof.

EXPLANATIONS OF LETTERS OR NUMERALS

10: towing vehicle, 12: towed vehicle, 18: traction device, 18a: hitch ball, 20: coupling member, 24: imaging unit, 26 and 34: display device, 28: sound output device, 30: operation input unit, 38: steering system, 40: ECU, 40a: CPU, 42: steering unit (steering wheel), 44: steered angle sensor, 46: shift sensor, 52: speed-change operation unit, 54: acquisition unit, 54a: coupling angle acquisition unit, 54b: steered angle acquisition unit, 54c: specification acquisition unit, 54d: assist request acquisition unit, 56: monitoring unit, 56a: turning center position calculation unit, 56b: balance determination unit, 56c: monitoring control unit, 58: display processing unit, 58a: real image processing unit, 58b: bird's-eye view image processing unit, 60: notification unit, 60a: indicator control unit, 60b: display mode control unit, 60c: sound mode control unit, 62: balance icon, 62a: tractor icon, 62b: trailer icon, 64: balance mark, 64a: bright spot, 64b: in-line mark

The invention claimed is:

1. A traction assist apparatus comprising:
a memory; and
a hardware processor coupled to the memory, the hardware processor being configured to:
  acquire a coupling angle between a towing vehicle and a towed vehicle towed by the towing vehicle and acquire a current steered angle of the towing vehicle;
  when the towing vehicle is moved backward at the current steered angle,
    determine whether the towed vehicle is movable backward in a balance state where the coupling angle is maintained, and
    monitor whether steering of the towing vehicle is continued in the balance state; and
  provide notification of presence or absence of the balance state and provide notification of whether the monitoring is continued,
wherein the hardware processor starts the monitoring when the towing vehicle starts to move in the balance state.

2. A traction assist apparatus comprising:
a memory; and
a hardware processor coupled to the memory, the hardware processor being configured to:
  acquire a coupling angle between a towing vehicle and a towed vehicle towed by the towing vehicle and acquire a current steered angle of the towing vehicle;
  when the towing vehicle is moved backward at the current steered angle,
    determine whether the towed vehicle is movable backward in a balance state where the coupling angle is maintained, and
    monitor whether steering of the towing vehicle is continued in the balance state; and
provide notification of presence or absence of the balance state and provide notification of whether the monitoring is continued,
wherein the hardware processor ends the monitoring when a difference between a steered angle of the towing vehicle where the balance state is established and a current steered angle of the towing vehicle after starting the monitoring is a first reference value or more.

3. A traction assist apparatus comprising:
a memory; and
a hardware processor coupled to the memory, the hardware processor being configured to:
  acquire a coupling angle between a towing vehicle and a towed vehicle towed by the towing vehicle and acquire a current steered angle of the towing vehicle;
  when the towing vehicle is moved backward at the current steered angle,
    determine whether the towed vehicle is movable backward in a balance state where the coupling angle is maintained, and monitor whether steering of the towing vehicle is continued in the balance state; and provide notification of presence or absence of the balance state and provide notification of whether the monitoring is continued, herein the hardware processor ends the monitoring when a difference between the steered angle of the towing vehicle where the balance state is established and a current steered angle of the towing vehicle after starting the monitoring is less than the first reference value, and a difference between a coupling angle between the towing vehicle and the towed vehicle where the balance state is established and a current coupling angle between the towing vehicle and the towed vehicle after starting the monitoring is a second reference value or more.

4. The traction assist apparatus according to claim 1, wherein the hardware processor executes the notification with sound.

5. The traction assist apparatus according to claim 1, wherein, when a center line in a vehicle front-rear direction of the towing vehicle is substantially parallel to a center line in a vehicle front-rear direction of the towed vehicle, the hardware processor further executes an in-line notification that the towing vehicle and the towed vehicle are coupled in an in-line state.

6. The traction assist apparatus according to claim 1, wherein, when the towing vehicle and the towed vehicle shift to the balance state, the hardware processor changes a notification mode of the notification.

* * * * *